United States Patent
Zhang et al.

(10) Patent No.: US 9,357,214 B2
(45) Date of Patent: May 31, 2016

(54) ADVANCED MERGE/SKIP MODE AND ADVANCED MOTION VECTOR PREDICTION (AMVP) MODE FOR 3D VIDEO

(71) Applicant: QUALCOMM Incorporated, San Diego, CA (US)

(72) Inventors: Li Zhang, San Diego, CA (US); Ying Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 424 days.

(21) Appl. No.: 14/098,151

(22) Filed: Dec. 5, 2013

(65) Prior Publication Data

US 2014/0161186 A1 Jun. 12, 2014

Related U.S. Application Data

(60) Provisional application No. 61/734,929, filed on Dec. 7, 2012, provisional application No. 61/747,350, filed on Dec. 30, 2012.

(51) Int. Cl.
*H04N 19/00* (2014.01)
*H04N 19/51* (2014.01)
*H04N 19/597* (2014.01)
*H04N 19/52* (2014.01)
*H04N 19/103* (2014.01)

(52) U.S. Cl.
CPC ....... *H04N 19/00696* (2013.01); *H04N 19/103* (2014.11); *H04N 19/52* (2014.11); *H04N 19/597* (2014.11)

(58) Field of Classification Search
CPC .......... H04N 19/00696; H04N 19/103; H04N 19/52; H04N 19/597
USPC ...................................... 375/240.16
See application file for complete search history.

(56) References Cited

PUBLICATIONS

Zhang, Li, "3D-CE5.h: Merge candidates derivation from disprity vector", Joint Collaborative Team on 3D Video Coding Extension Developmentof ITU-T SG 16 WP 3 and ISO/IEC JTC 1/SC 29/WG 11, 2nd Meeting Shanghai, CN, Oct. 13-19, 2012.*
Guionnet, Thomas, "CE5.h: Merge candidate list for disparity compensated prediction", Joint Collaborative Team on 3D Video Coding Extension Developmentof ITU-T SG 16 WP 3 and ISO/IEC JTC 1/SC 29/WG 11, 2nd Meeting Shanghai, CN, Oct. 13-19, 2012.*
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.

(Continued)

*Primary Examiner* — Jeffery Williams
(74) *Attorney, Agent, or Firm* — Shumaker & Sieffert, P.A.

(57) ABSTRACT

Techniques are described where if an inter-view predicted motion vector candidate (IPMVC) and an inter-view disparity motion vector candidate (IDMVC) are derived based on a shifted disparity vector, where the amount by which the disparity vector is shifted for the IPMVC and IDMVC is different. The techniques also prioritize the inclusion of the IPMVC over the IDMVC in a candidate list, and prune the IPMVC and the IDMVC if there is a duplicated IPMVC or IDMVC in the candidate list.

25 Claims, 9 Drawing Sheets

(56) References Cited

PUBLICATIONS

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

An, et al., "3D-CE5.h related: Inter-view motion prediction for HEVC-based 3D video coding", JCT-3V Meeting; MPEG Meeting; Jul. 16-20, 2012; Stockholm; (The Joint Collaborative Team on 3D Video Coding Extension Development of ISO/IEC JTC1/SC29/WG11 and ITU-T SG.16); URL: http://phenix.int-evry.fr/jct2/, No. JCT3V-A0049, XP030130048, 6 pp.

Chang, et al., "CE5.h related: Depth-oriented Neighboring Block Disparity Vector (DoNBDV) with virtual depth", JCT-3V Meeting; MPEG Meeting; Oct. 13-19, 2012; Shanghai; (The Joint Collaborative Team on 3D Video Coding Extension Development of ISO/IEC JTC1/SC29/WG11 and ITU-T SG.16); URL: http://phenix.int-evry.fr/jct2, No. JCT3V-B0090, XP030130271, 5 pp.

Guionnet, et al., "CE5.h: Merge candidate list for disparity compensated prediction", JCT-3V Meeting; MPEG Meeting; Oct. 13-19, 2012• Shanghai• (The Joint Collaborative Team on 3D Video Coding Extension Development of ISO/IEC JTC1/SC29/WG11 and ITU-T SG.16); URL: http://phenix.int-evry.fr/jct2/, No. JCT3V-B0080, XP030130261, 6 pp.

Lin et al: "3D-CE5.a related motion vector competition-based Skip/Direct mode with explicit signaling", MPEG Meeting; Apr. 30, 2012-May 4, 2012; Geneva; (Motion Picture Expert Group or ISO/IEC JTC1/SC29/WG11),, No. m24847, XP030053190, 5 pp.

Yea, et al., "BoG Report: Motion/mode Parameter Prediction CE5.h" JCT-3V Meeting; MPEG Meeting; Oct. 13-19, 2012; Shanghai; (The Joint Collaborative Team on 3D Video Coding Extension Development of ISO/IEC JTC1/SC29/WG11 and ITU-T SG.16); URL: http://phenix.int-evry.fr/jct2/, JCT3V-B0218, XP030130399, 14 pp.

Zhang, et al., "3D-CE5.h: Merge candidates derivation from disparity vector shifting", JCT-3V Meeting: MPEG Meeting; Jan. 17-23, 2013; Geneva; (The Joint Collaborative Team on 3D Video Coding Extension Development of ISO/IEC JTC1/SC29/WG11 and ITU-T SG.16 ); URL: http://phenix.int-evry.fr/jct2/,, No. JCT3V-C0045, XP030130461, 4 pp.

Zhang, et al., "3D-CE5.h: Merge candidates derivation from disparity vector," Joint Collaborative Team on 3D Video Coding Extension Development of ITU-T SG 16 WP 3 and ISO/IEC JTC 1/SC 29/WG 11, Document: JCT3V-B0048, Qualcomm Incorporated, 2nd Meeting: Shanghai, CN, Oct. 13-19, 2012, XP030130229, 4 pp.

International Search Report and Written Opinion from International Application No. PCT/US2013/073649, dated Mar. 4, 2014, 16 pp.

Second Written Opinion from International Application No. PCT/US2013/073649, dated Dec. 3, 2014, 7 pp.

International Preliminary Report on Patentability from International Application No. PCT/US2013/073649, dated Feb. 18, 2015, 10 pp.

\* cited by examiner

ADVANCED MERGE/SKIP MODE AND ADVANCED MOTION VECTOR PREDICTION (AMVP) MODE FOR 3D VIDEO

This application claims the benefit of

U.S. Provisional Application No. 61/734,929, filed 7 Dec. 2012, and

U.S. Provisional Application No. 61/747,350, filed 30 Dec. 2012, the entire content of each is incorporated by reference herein.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for improving coding efficiency of motion prediction in multiview and 3D video coding. For example, the techniques may utilize inter-view predicted motion vector candidates and inter-view disparity motion vector candidates as candidates in a candidate list for merge/skip mode and advanced motion vector prediction (AMVP) mode. The techniques may shift a disparity vector, for a current block being inter-predicted, by a first offset to identify a reference block in a reference view for deriving the inter-view prediction motion vector candidate and shift the disparity vector by a second, different offset to convert the shifted disparity vector into the inter-view disparity motion vector candidate.

In some examples, the techniques may include only the inter-view predicted motion vector candidate in the candidate list if the inter-view predicted motion vector candidate is available, and include only the inter-view disparity motion vector candidate in the candidate list if the inter-view predicted motion vector candidate is not available. In some examples, the techniques may not include the inter-view prediction motion vector candidate in the candidate list, even if it is available, if the motion information for another inter-view prediction motion vector candidate (e.g., one derived without shifting the disparity vector) is already included in the candidate list.

In one example, the disclosure describes a method of coding video data, the method includes determining whether a current block is inter-predicted in merge mode, skip mode, or advanced motion vector prediction (AMVP) mode, if the current block is inter-predicted in AMVP mode, determining whether to derive an inter-view disparity motion vector candidate (IDMVC) or an inter-view predicted motion vector candidate (IPMVC) based on at least one reference picture index, and if the current block is inter-predicted in merge mode or skip mode, determining availability of the IPMVC. In this example, the IPMVC comprises motion information for a reference block in a reference view referred to by a disparity vector, for the current block, shifted by a first offset value, and the IDMVC comprises the disparity vector, for the current block, shifted by a second, different offset value. The method also includes determining whether the IPMVC or the IDMVC is to be included in a candidate list, and inter-prediction coding the current block in a current picture in a current view, different form the reference view, based on the candidate list.

In one example, the disclosure described a device for coding video data, the device comprising a video coder configured to determine whether a current block is inter-predicted in merge mode, skip mode, or advanced motion vector prediction (AMVP) mode, if the current block is inter-predicted in AMVP mode, determine whether to derive an inter-view disparity motion vector candidate (IDMVC) or an inter-view predicted motion vector candidate (IPMVC) based on at least one reference picture index, and if the current block is inter-predicted in merge mode or skip mode, determine availability of the IPMVC. In this example, the IPMVC comprises motion information for a reference block in a reference view referred to by a disparity vector, for the current block, shifted by a first offset value, and the IDMVC comprises the disparity vector, for the current block, shifted by a second, different offset value. The video coder is also configured to determine whether the IPMVC or the IDMVC is to be included in a candidate list, and inter-prediction code the current block in a current picture in a current view, different form the reference view, based on the candidate list.

In one example, the disclosure describes a computer-readable storage medium having instructions stored thereon that when executed cause one or more processors of a device for coding video data to determine whether a current block is inter-predicted in merge mode, skip mode, or advanced motion vector prediction (AMVP) mode, if the current block is inter-predicted in AMVP mode, determine whether to derive an inter-view disparity motion vector candidate (IDMVC) or an inter-view predicted motion vector candidate (IPMVC) based on at least one reference picture index, and if the current block is inter-predicted in merge mode or skip mode, determine availability of the IPMVC. In this example, the IPMVC comprises motion information for a reference block in a reference view referred to by a disparity vector, for the current block, shifted by a first offset value, and the IDMVC comprises the disparity vector, for the current block, shifted by a second, different offset value. The instructions also cause the one or more processors to determine whether the IPMVC or the IDMVC is to be included in a candidate list, and inter-prediction code the current block in a current picture in a current view, different form the reference view, based on the candidate list.

In one example, the disclosure describes a device for coding video data comprising means for determining whether a current block is inter-predicted in merge mode, skip mode, or advanced motion vector prediction (AMVP) mode, if the current block is inter-predicted in AMVP mode, means for determining whether to derive an inter-view disparity motion vector candidate (IDMVC) or an inter-view predicted motion vector candidate (IPMVC) based on at least one reference picture index, and if the current block is inter-predicted in merge mode or skip mode, means for determining availability of the IPMVC. In this example, the IPMVC comprises motion information for a reference block in a reference view referred to by a disparity vector, for the current block, shifted by a first offset value, and the IDMVC comprises the disparity vector, for the current block, shifted by a second, different offset value. The device also includes means for determining whether the IPMVC or the IDMVC is to be included in a candidate list, and means for inter-prediction coding the current block in a current picture in a current view, different form the reference view, based on the candidate list.

The details of one or more examples are set forth in the accompanying drawings and the description below. Other features, objects, and advantages will be apparent from the description and drawings, and from the claims.

DETAILED DESCRIPTION

Figure 1:
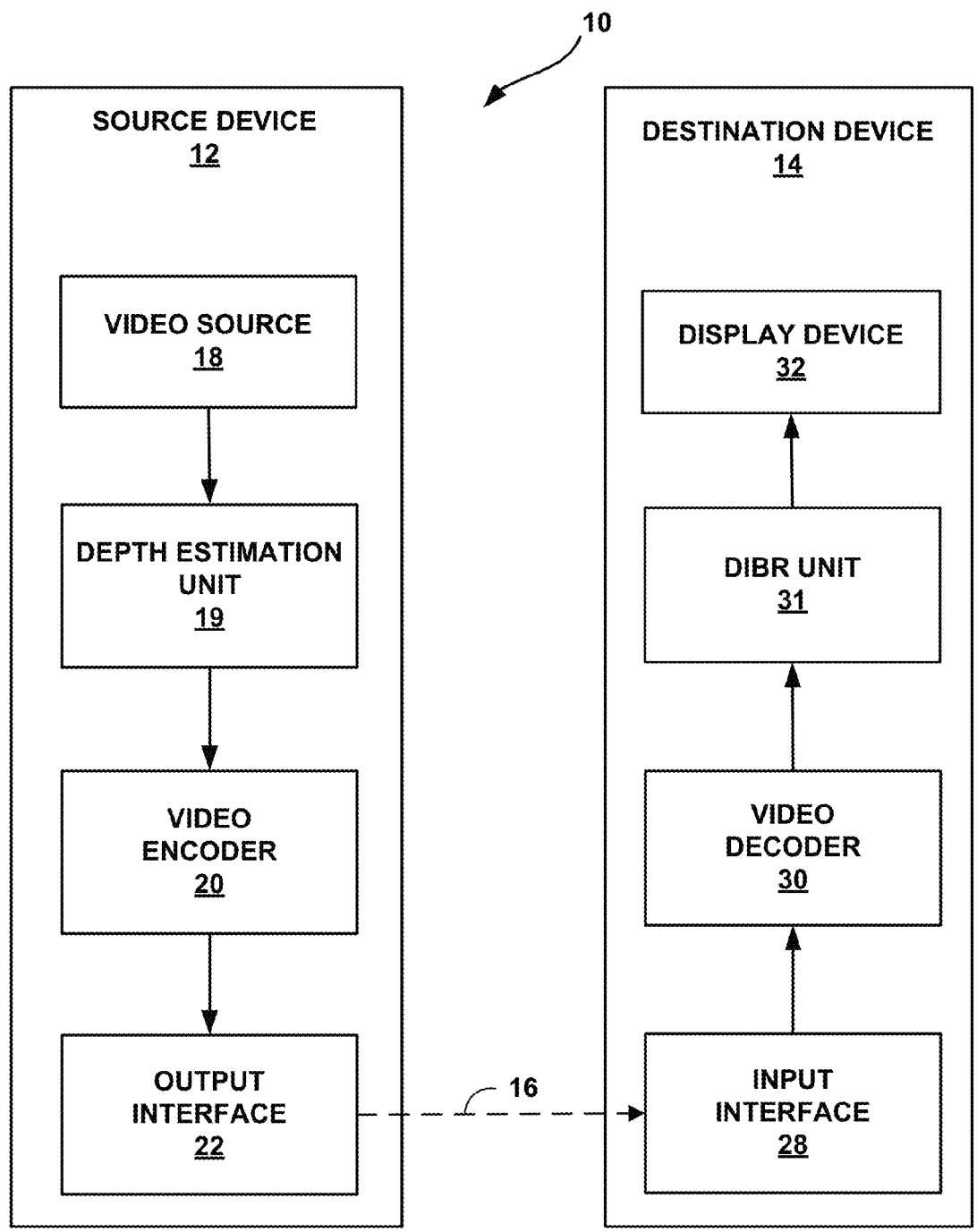
FIG. 1 is a block diagram illustrating an example video encoding and decoding system that may utilize the inter-prediction techniques of this disclosure.

This disclosure describes techniques related to the signaling of motion parameters in multiview video coding, including in the newly emerging three-dimensional High Efficiency Video Coding standard, commonly referred to as 3D HEVC. Video compression techniques can include predicting a current block of video data based on an already coded block of video data. In this disclosure, the term current block generally refers to a block of video data currently being coded (e.g., encoded or decoded), as opposed to video blocks that are already coded or video blocks that are yet to be coded. In an intra prediction mode, the current block is predicted based on one or more previously coded blocks in the same picture as the current block, while in an inter prediction mode the current block is predicted based on an already coded block in a different picture. The different picture may be either a picture of a different time instance from the same view as the current block (e.g., a picture in another access unit than the access unit that includes the current picture) or may be a picture from the same time instance but from a different view (e.g., a picture in the same access unit as the access unit that includes the current picture).

When a video decoder is to perform inter prediction for a given video block, motion parameters are signaled in an encoded video bitstream. The motion parameters define, for example, a motion vector, a reference picture index, and a prediction direction so that the video decoder can determine which block in which picture to use as the predictive block for the current block. A video coder may use various modes for signaling motion parameters in an encoded bitstream. In order to reduce the number of bits needed to implement inter-predictive coding, some of those modes may utilize prediction of motion parameters instead of explicit signaling of motion parameters. In the High Efficiency Video Coding (HEVC) standard, there are various modes for the prediction of motion parameters, one of which is referred to as merge mode. In merge mode, a video coder constructs a candidate list of motion parameters (e.g., reference pictures and motion vectors) using as candidates motion parameters from neighboring blocks, including spatial neighboring blocks and temporal neighboring blocks, and in the case of 3D-HEVC also including inter-view neighboring blocks. The chosen motion parameters are signaled from a video encoder to a video decoder by transmitting an index of the selected candidate from the candidate list. At the video decoder, once the index is decoded, all the motion parameters of the corresponding block of the selected candidate are inherited. A video encoder and video decoder are configured to construct the same lists based on already coded blocks. Therefore, based on the index, the video decoder can identify the motion parameters of the candidate selected by the video encoder.

Another mode for predicting motion parameters is skip mode. Skip mode generally operates in the same manner described above for merge mode, but in skip mode, no residual data is added to the predicted block, whereas in merge mode, residual data is added to the predicted block. The constructing of a list and transmitting of an index to identify a candidate in the list described above with reference to merge mode is generally also performed in skip mode. Some video codecs may treat skip mode as a separate mode from merge mode, while other video coding standards, including HEVC and its extensions, may treat skip mode as a special case of merge mode.

Another mode for predicting motion parameters is advanced motion vector prediction (AMVP) mode. In AMVP mode a candidate list of motion vector predictors for each motion hypothesis is derived based on the coded reference index. This list includes motion vectors of neighboring blocks that are associated with the same reference index as well as a temporal motion vector predictor which is derived based on the motion parameters of the neighboring block of the co-located block in a temporal reference picture. The chosen motion vectors are signaled by transmitting an index into the candidate list. In addition, the reference index values and motion vector differences are also signaled. In this disclosure, the term motion vector predictor is generally used to refer to any motion vector from which one or more motion vectors are predicted. In some instances, the motion vector predictor and the predicted motion vector may be identical, while in other instances the motion vector predictor and the predicted motion vector may be different. In AMVP mode, for example, the predicted motion vector corresponds to the motion vector predictor plus motion vector difference values. This disclosure also refers to the term directional motion predictor, which generally refers to a motion vector predictor associate with a particular direction (i.e. a particular reference picture list). In the case of bi-prediction, a motion vector predictor may include two directional motion predictors.

A disparity vector is generally used to identify the location of a block in an inter-view reference picture that corresponds to a current block of a current view. To derive a disparity vector (DV) for a current block, a technique called Neighboring Blocks based Disparity Vector (NBDV) derivation is used in some current versions of 3D-HEVC Test Model (3D-HTM). NBDV utilizes disparity motion vectors from spatial and temporal neighboring blocks of the current block. In NBDV, the disparity motion vectors of spatial or temporal neighboring blocks are checked in a fixed order. Once a disparity motion vector (i.e., a motion vector that points to an inter-view reference picture) is identified, the checking process is terminated and the identified disparity motion vector is converted to a DV for the current block. The DV can be used in inter-view motion prediction and/or inter-view residue prediction. If no disparity motion vector is found after checking all the pre-defined neighboring blocks, a zero DV may be used for inter-view motion prediction while inter-view residual prediction may be disabled for the corresponding prediction unit (PU).

In some examples, the disparity vector for the current block may be derived from a disparity vector of a neighboring block. For example, a neighboring block (e.g., spatial or temporal neighboring block) may not have been inter-predicted with a disparity motion vector. However, during the encoding or decoding of the neighboring block, a disparity vector for that neighboring block may have been derived. This derived disparity vector of the neighboring block may be used as the disparity vector for the current block. For example, if none of the neighboring blocks, that are evaluated, are inter-predicted with a disparity motion vector, but a derived disparity vector exits for a neighboring block, a video encoder and a video decoder may set the derived disparity vector of the neighboring block as the disparity vector for the current block.

Based on the DV, a new motion vector candidate, referred to as an inter-view predicted motion vector, if available, may be added to candidate lists for AMVP and skip/merge modes. The inter-view predicted motion vector, if available, is a temporal motion vector. In general, this disclosure describes techniques for improving coding efficiency of motion prediction in multiview and 3D video coding.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface 28. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, depth estimation unit 19, video encoder 20, and output interface 22. Destination device 14 includes input interface 28, video decoder 30, depth image based rendering (DIBR) unit 31, and display device 32. In other examples, a source device and a destination device may include other components or arrangements. For example, source device 12 may receive video data from an external video source 18, such as an external camera. Likewise, destination device 14 may interface with an external display device, rather than including an integrated display device. Many of the techniques described in this disclosure can be performed by both video encoder 20 and video decoder 30. Therefore, for ease of explanation, video encoder 20 and video decoder 30 may at times jointly be referred to as video coder 20/30. Techniques described relative to video coder 20/30 may be performed either by video encoder 20 or video decoder 30.

The illustrated system 10 of FIG. 1 is merely one example. The techniques of this disclosure may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Video source 18 may provide multiple views of video data to video encoder 20. For example, video source 18 may correspond to an array of cameras, each having a unique horizontal position relative to a particular scene being filmed. Alternatively, video source 18 may generate video data from disparate horizontal camera perspectives, e.g., using computer graphics. Depth estimation unit 19 may be configured to determine values for depth pixels corresponding to pixels in a texture image. For example, depth estimation unit 19 may represent a Sound Navigation and Ranging (SONAR) unit, a Light Detection and Ranging (LIDAR) unit, or other unit capable of directly determining depth values substantially simultaneously while recording video data of a scene.

Additionally or alternatively, depth estimation unit 19 may be configured to calculate depth values indirectly by comparing two or more images that were captured at substantially the same time from different horizontal camera perspectives. By calculating horizontal disparity between substantially similar pixel values in the images, depth estimation unit 19 may approximate depth of various objects in the scene. Depth estimation unit 19 may be functionally integrated with video source 18, in some examples. For example, when video source 18 generates computer graphics images, depth estimation unit 19 may provide actual depth maps for graphical objects, e.g., using z-coordinates of pixels and objects used to render texture images.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., group of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device. In some examples, display device 32 may comprise a device capable of displaying two or more views simultaneously or substantially simultaneously, e.g., to produce a 3D visual effect for a viewer.

DIBR unit 31 of destination device 14 may render synthesized views using texture and depth information of decoded views received from video decoder 30. For example, DIBR unit 31 may determine horizontal disparity for pixel data of texture images as a function of values of pixels in corresponding depth maps. DIBR unit 31 may then generate a synthesized image by offsetting pixels in a texture image left or right by the determined horizontal disparity. In this manner, display device 32 may display one or more views, which may correspond to decoded views and/or synthesized views, in any combination. In accordance with the techniques of this disclosure, video decoder 30 may provide original and updated precision values for depth ranges and camera parameters to DIBR unit 31, which may use the depth ranges and camera parameters to properly synthesize views.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 may operate according to a video coding standard, such as the High Efficiency Video Coding (HEVC) standard, and may conform to the HEVC Test Model (HM). A recent draft of the upcoming HEVC standard is described in document HCTVC-J1003, Bross et al., "High Efficiency Video Coding (HEVC) Text Specification Draft 8," Joint Collaborative Team on Video Coding (JCT-VC) of ITU-T SG16 WP3 and ISO/IEC JTC1/SC29/WG11, 10th Meeting: Stockholm, Sweden, Jul. 11, 2012 to Jul. 12, 2012, which, as of 4 Dec. 2013, is downloadable from http://phenix.int-evry.fr/jct/doc_end_user/documents/10_Stockholm/wg11/JCTVC-J1003-v8.zip. Another recent draft of the HEVC standard, referred to as "HEVC Working Draft 10" or "WD10," is described in document JCTVC-L1003v34, Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, CH, 14-23 Jan., 2013, which, as of 4 Dec. 2013, is downloadable from http://phenix.int-evry.fr/jct/doc_end_user/documents/12_Geneva/wg11/JCTVC-L1003-v34.zip. Yet another draft of the HEVC standard, is referred to herein as "WD10 revisions" described in Bross et al., "Editors' proposed corrections to HEVC version 1," Joint Collaborative Team on Video Coding (JCT-VC) of ITU-T SG16 WP3 and ISO/IEC JTC1/SC29/WG11, 13th Meeting, Incheon, KR, April 2013, which as of 4 Dec. 2013, is available from http://phenix.int-evry.fr/jct/doc_end_user/documents/13_Incheon/wg11/JCTVC-M0432-v3.zip.

For purposes of illustration, the techniques of this disclosure are described primarily with respect to the 3DV extension of HEVC. However, it should be understood that these techniques may be applied to other standards for coding video data used to produce a three-dimensional effect as well.

A Joint Collaboration Team on 3D Video Coding (JCT-3C) of VCEG and MPEG is developing a 3DV standard based on HEVC, for which part of the standardization efforts includes the standardization of the multiview video codec based on HEVC (MV-HEVC) and another part for 3D Video coding based on HEVC (3D-HEVC). For MV-HEVC, it is generally desired that there are only high-level syntax (HLS) changes relative to HEVC, such that no module in the CU/PU level in HEVC needs to be re-designed and can be fully reused for MV-HEVC. For 3D-HEVC, new coding tools, including those in coding at the unit/prediction unit level, for both texture and depth views may be included and supported. The latest software 3D-HTM for 3D-HEVC can be downloaded, as of 4 Dec. 2013, from the following link: https://hevc.hhi.fraunhofer.de/svn/svn_HEVCSoftware/trunk/ or https://hevc.hhi.fraunhofer.de/svn/svn_3DVCSoftware/tags/HTM-5.0/.

Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards, such as the MVC extension of ITU-T H.264/AVC. In particular, the techniques of this disclosure are related to multiview and/or 3D video coding based on advanced codecs. In general, the techniques of this disclosure may be applied to any of a variety of different video coding standards. For example, these techniques may be applied to the multi-view video coding (MVC) extension of ITU-T H.264/AVC (advanced video coding), to a 3D video (3DV) extension of the upcoming HEVC standard (e.g., 3D-HEVC), or other coding standard.

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

Initially, example coding techniques of HEVC will be discussed. The JCT-VC developed the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three angular intra-prediction encoding modes plus DC and Planar modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock.

If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or merge mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In this section, multiview and multiview plus depth coding techniques will be discussed. Initially, MVC techniques will be discussed. As noted above, MVC is an extension of ITU-T H.264/AVC. In MVC, data for a plurality of views is coded in time-first order, and accordingly, the decoding order arrangement is referred to as time-first coding. In particular, view components (that is, pictures) for each of the plurality of views at a common time instance may be coded, then another set of view components for a different time instance may be coded, and so on. An access unit may include coded pictures of all of the views for one output time instance. It should be understood that the decoding order of access units is not necessarily identical to the output (or display) order.

Figure 2:
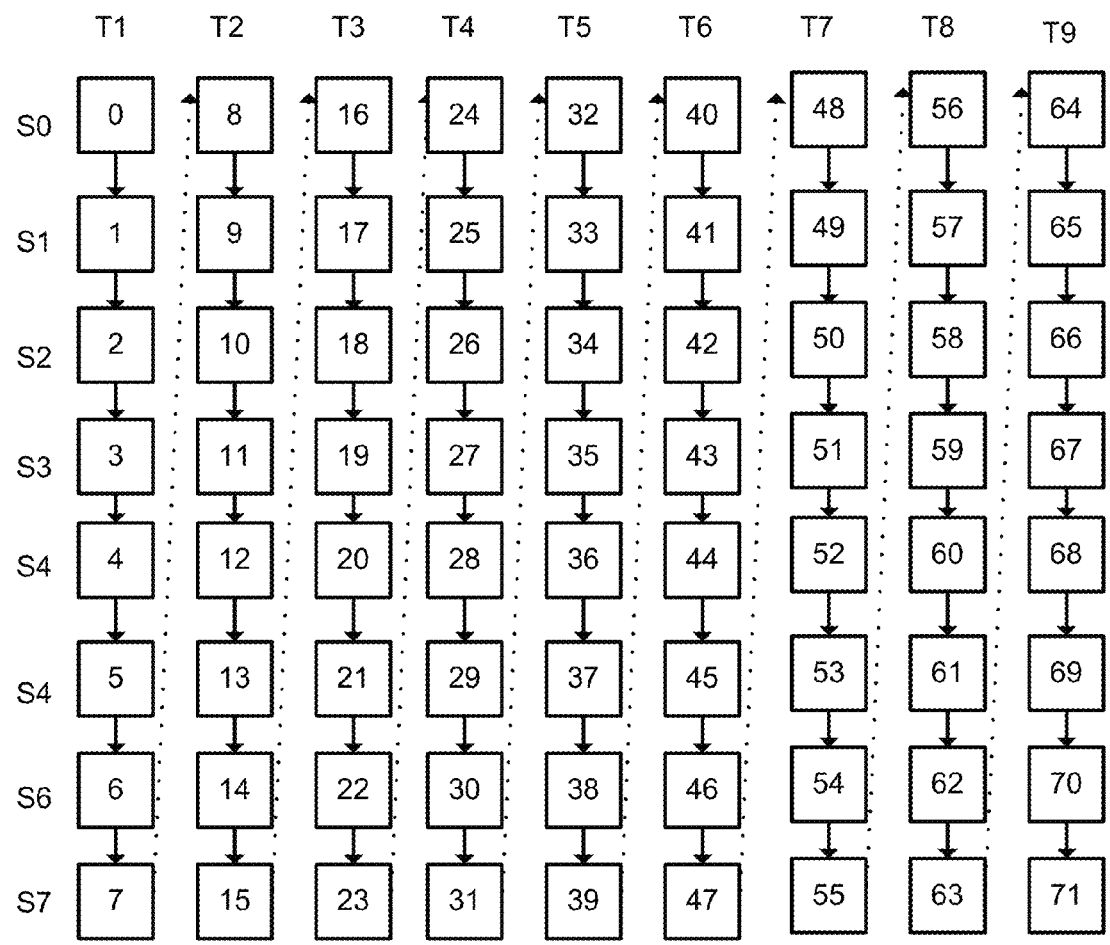
FIG. 2 is a conceptual diagram illustrating an example decoding order for multi-view video.

FIG. 2 shows a typical MVC decoding order (i.e., bitstream order). The decoding order arrangement is referred to as time-first coding. Note that the decoding order of access units may not be identical to the output or display order. In FIG. 2, S0-S7 each refers to different views of the multiview video. T0-T8 each represents one output time instance. An access unit may include the coded pictures of all the views for one output time instance. For example, a first access unit may include all of the views S0-S7 for time instance T0, a second access unit may include all of the views S0-S7 for time instance T1, and so forth.

For purposes of brevity, the disclosure may use the following definitions:

view component: A coded representation of a view in a single access unit. When a view includes both coded texture and depth representations, a view component consists of a texture view component and a depth view component.

texture view component: A coded representation of the texture of a view in a single access unit.

depth view component: A coded representation of the depth of a view in a single access unit.

In FIG. 2, each of the views includes sets of pictures. For example, view S0 includes set of pictures 0, 8, 16, 24, 32, 40, 48, 56, and 64, view S1 includes set of pictures 1, 9, 17, 25, 33, 41, 49, 57, and 65, and so forth. Each set includes two pictures: one picture is referred to as a texture view component, and the other picture is referred to as a depth view component. The texture view component and the depth view component within a set of pictures of a view may be considered as corresponding to one another. For example, the texture view component within a set of pictures of a view is considered as corresponding to the depth view component within the set of the pictures of the view, and vice-versa (i.e., the depth view component corresponds to its texture view component in the set, and vice-versa). As used in this disclosure, a texture view component that corresponds to a depth view component may be considered as the texture view component and the depth view component being part of a same view of a single access unit.

The texture view component includes the actual image content that is displayed. For example, the texture view component may include luma (Y) and chroma (Cb and Cr) components. The depth view component may indicate relative depths of the pixels in its corresponding texture view component. As one example, the depth view component is a gray scale image that includes only luma values. In other words, the depth view component may not convey any image content, but rather provide a measure of the relative depths of the pixels in the texture view component.

For example, a purely white pixel in the depth view component indicates that its corresponding pixel or pixels in the corresponding texture view component is closer from the perspective of the viewer, and a purely black pixel in the depth view component indicates that its corresponding pixel or pixels in the corresponding texture view component is further away from the perspective of the viewer. The various shades of gray in between black and white indicate different depth levels. For instance, a very gray pixel in the depth view component indicates that its corresponding pixel in the texture view component is further away than a slightly gray pixel in the depth view component. Because only gray scale is needed to identify the depth of pixels, the depth view component need not include chroma components, as color values for the depth view component may not serve any purpose.

The depth view component using only luma values (e.g., intensity values) to identify depth is provided for illustration purposes and should not be considered limiting. In other examples, any technique may be utilized to indicate relative depths of the pixels in the texture view component.

Figure 3:
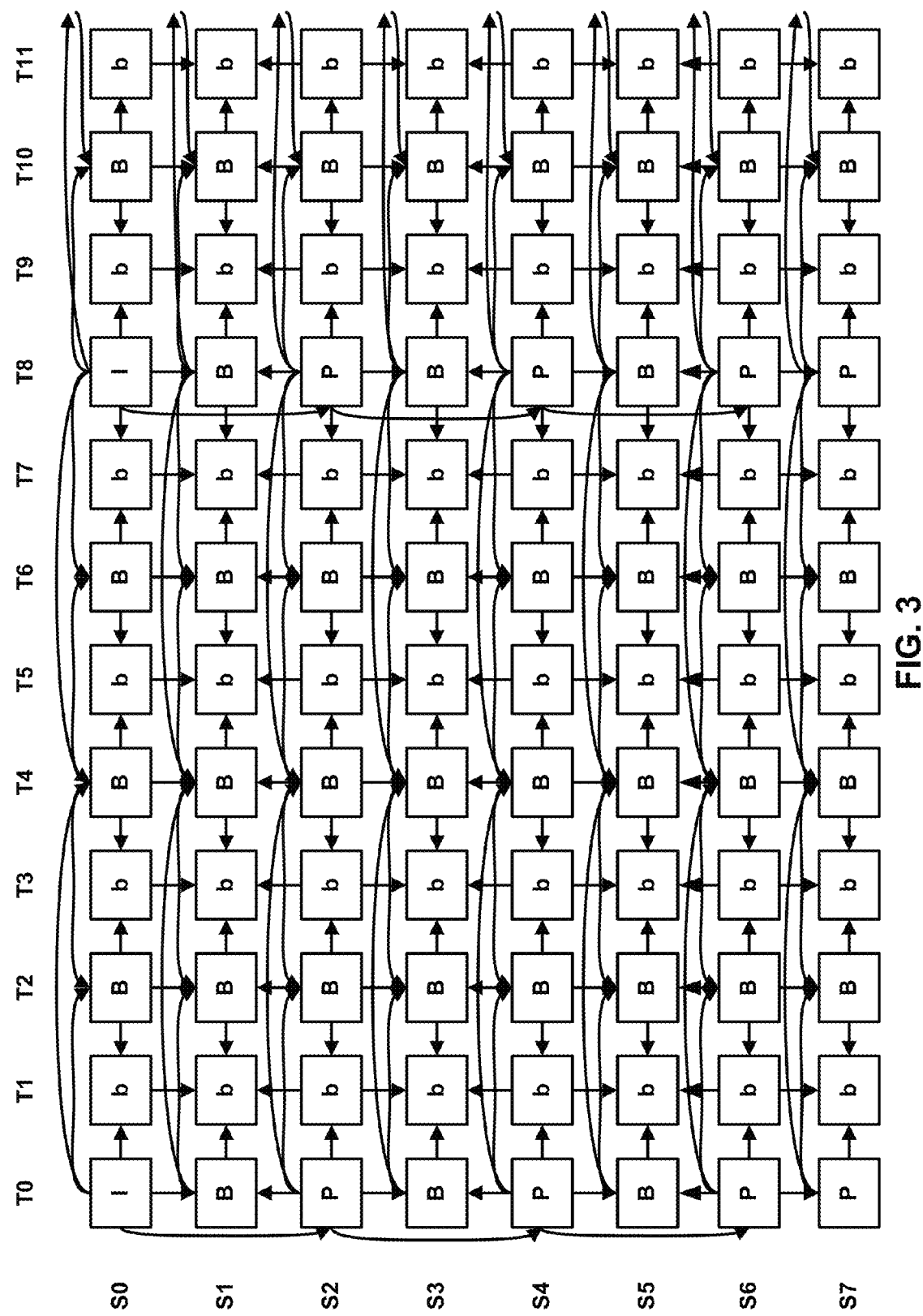
FIG. 3 is a conceptual diagram illustrating an example prediction structure for multi-view video.

FIG. 3 shows a typical MVC prediction structure (including both inter-picture prediction within each view and inter-view prediction) for multi-view video coding. Prediction directions in FIG. 3 are indicated by arrows, with the pointed-to object using the pointed-from object as the prediction reference. In MVC, inter-view prediction is supported by disparity motion compensation, which uses the syntax of the H.264/AVC motion compensation, but allows a picture in a different view to be used as a reference picture.

In the example of FIG. 3, six views (having view IDs "S0" through "S5") are illustrated, and twelve temporal locations ("T0" through "T11") are illustrated for each view. That is, each row in FIG. 3 corresponds to a view, while each column indicates a temporal location.

Although MVC has a so-called base view, which is decodable by H.264/AVC decoders, and stereo view pairs could be supported also by MVC, the advantage of MVC is that it could support an example that uses more than two views as a 3D video input and decodes this 3D video represented by the multiple views. A renderer of a client having an MVC decoder may expect 3D video content with multiple views.

Pictures in FIG. 3 are indicated at the intersection of each row and each column. The H.264/AVC standard may use the term frame to represent a portion of the video. This disclosure may use the term picture and frame interchangeably.

The pictures in FIG. 3 are illustrated using a block including a letter, the letter designating whether the corresponding picture is intra-coded (that is, an I-picture), or inter-coded in one direction (that is, as a P-picture) or in multiple directions (that is, as a B-picture). In general, predictions are indicated by arrows, where the pointed-to pictures use the pointed-from picture for prediction reference. For example, the P-picture of view S2 at temporal location T0 is predicted from the I-picture of view S0 at temporal location T0.

As with single view video encoding, pictures of a multiview video coding video sequence may be predictively encoded with respect to pictures at different temporal locations. For example, the b-picture of view S0 at temporal location T1 has an arrow pointed to it from the I-picture of view S0 at temporal location T0, indicating that the b-picture is predicted from the I-picture. Additionally, however, in the context of multiview video encoding, pictures may be inter-view predicted. That is, a view component can use the view components in other views for reference. In MVC, for example, inter-view prediction is realized as if the view component in another view is an inter-prediction reference. The potential inter-view references are signaled in the Sequence Parameter Set (SPS) MVC extension and can be modified by the reference picture list construction process, which enables flexible ordering of the inter-prediction or inter-view prediction references. Inter-view prediction is also a feature of proposed multiview extension of HEVC, including 3D-HEVC (multiview plus depth).

FIG. 3 provides various examples of inter-view prediction. Pictures of view S1, in the example of FIG. 3, are illustrated as being predicted from pictures at different temporal locations of view S1, as well as inter-view predicted from pictures of views S0 and S2 at the same temporal locations. For example, the b-picture of view S1 at temporal location T1 is predicted from each of the B-pictures of view S1 at temporal locations T0 and T2, as well as the b-pictures of views S0 and S2 at temporal location T1.

In some examples, FIG. 3 may be viewed as illustrating the texture view components. For example, the I-, P-, B-, and b-pictures illustrated in FIG. 2 may be considered as texture view components for each of the views. In accordance with the techniques described in this disclosure, for each of the texture view components illustrated in FIG. 3 there is a corresponding depth view component. In some examples, the depth view components may be predicted in a manner similar to that illustrated in FIG. 3 for the corresponding texture view components.

Coding of two views could also be supported also MVC. One of the advantages of MVC is that an MVC encoder could take more than two views as a 3D video input and an MVC decoder can decode such a multiview representation. As such, any renderer with an MVC decoder may expect 3D video contents with more than two views.

In MVC, inter-view prediction is allowed among pictures in the same access unit (i.e., with the same time instance). When coding a picture in one of the non-base views, a picture may be added into a reference picture list if it is in a different view, but within the same time instance. An inter-view reference picture can be put in any position of a reference picture list, just like any inter prediction reference picture. As shown in FIG. 3, a view component can use the view components in other views for reference. In MVC, inter-view prediction is realized as if the view component in another view was an inter-prediction reference.

The following describes some relevant HEVC techniques relating to inter-prediction that may be used with multiview coding and/or multiview coding (MV-HEVC) with depth (3D-HEVC). The first technique for discussion is reference picture list construction for inter-prediction.

Coding a PU using inter-prediction involves calculating a motion vector between a current block (e.g., PU) and a block in a reference frame. Motion vectors are calculated through a process called motion estimation (or motion search). A motion vector, for example, may indicate the displacement of a prediction unit in a current frame relative to a reference sample of a reference frame. A reference sample may be a block that is found to closely match the portion of the CU including the PU being coded in terms of pixel difference, which may be determined by sum of absolute difference (SAD), sum of squared difference (SSD), or other difference metrics. The reference sample may occur anywhere within a reference frame or reference slice. In some examples, the reference sample may occur at a fractional pixel position. Upon finding a portion of the reference frame that best matches the current portion, the encoder determines the current motion vector for the current block as the difference in the location from the current block to the matching portion in the reference frame (e.g., from the center of the current block to the center of the matching portion).

In some examples, an encoder may signal the motion vector for each block in the encoded video bitstream. The signaled motion vector is used by the decoder to perform motion compensation in order to decode the video data. However, signaling the original motion vector directly may result in less efficient coding, as a large number of bits are typically needed to convey the information.

In some instances, rather than directly signaling the original motion vector, the encoder may predict a motion vector for each partition, i.e., for each PU. In performing this motion vector prediction, the encoder may select a set of motion vector candidates determined from spatially neighboring blocks in the same frame as the current block or a temporal motion vector candidate determined from a co-located block in a reference frame (i.e., a frame other than the current frame). Video encoder 20 may perform motion vector prediction, and if needed, signal an index to a reference picture to predict the motion vector, rather than signal an original motion vector, to reduce bit rate in signaling. The motion vector candidates from the spatially neighboring blocks may be referred to as spatial MVP candidates, whereas the motion vector candidates from co-located blocks in another reference frame may be referred to as temporal MVP candidates.

Two different modes or types of motion vector prediction are proposed in the HEVC standard. One mode is referred to as a "merge" mode. The other mode is referred to as adaptive motion vector prediction (AMVP).

In merge mode, video encoder 20 instructs video decoder 30, through bitstream signaling of prediction syntax, to copy a motion vector, reference index (identifying a reference frame, in a given reference picture list, to which the motion vector points) and the motion prediction direction (which identifies the reference picture list (List 0 or List 1), i.e., in terms of whether the reference frame temporally precedes or follows the currently frame) from a selected motion vector candidate for a current block of the frame. This is accomplished by signaling in the bitstream an index into a motion vector candidate list identifying the selected motion vector candidate (i.e., the particular spatial MVP candidate or temporal MVP candidate).

Thus, for merge mode, the prediction syntax may include a flag identifying the mode (in this case "merge" mode) and an index identifying the selected motion vector candidate. In some instances, the motion vector candidate will be in a causal block in reference to the current block. That is, the motion vector candidate will have already been decoded by video decoder 30. As such, video decoder 30 has already received and/or determined the motion vector, reference index, and motion prediction direction for the causal block. Accordingly, video decoder 30 may simply retrieve the motion vector, reference index, and motion prediction direction associated with the causal block from memory and copy these values as the motion information for the current block. To reconstruct a block in merge mode, video decoder 30 obtains the predictive block using the derived motion information for the current block, and adds the residual data to the predictive block to reconstruct the coded block. For the skip mode, the same merge candidate list is generated but no residual is signaled. For simplicity, as skip mode has the same motion vector derivation process as merge mode, all techniques described in this document apply to both merge and skip modes.

In AMVP, video encoder 20 instructs video decoder 30, through bitstream signaling, to only copy the motion vector from the candidate block and use the copied vector as a predictor for motion vector of the current block, and signals the motion vector difference (MVD). The reference frame and the prediction direction associated with the motion vector of the current block are signaled separately. An MVD is the difference between the current motion vector for the current block and a motion vector predictor derived from a candidate block. In this case, video encoder 20, using motion estimation, determines an actual motion vector for the block to be coded, and then determines the difference between the actual motion vector and the motion vector predictor as the MVD value. In this way, video decoder 30 does not use an exact copy of the motion vector candidate as the current motion vector, as in the merge mode, but may rather use a motion vector candidate that may be "close" in value to the current motion vector determined from motion estimation and add the MVD to reproduce the current motion vector. To reconstruct a block in AMVP mode, the decoder adds the corresponding residual data to reconstruct the coded block.

In most circumstances, the MVD requires fewer bits to signal than the entire current motion vector. As such, AMVP allows for more precise signaling of the current motion vector while maintaining coding efficiency over sending the whole motion vector. In contrast, the merge mode does not allow for the specification of an MVD, and as such, merge mode sacrifices accuracy of motion vector signaling for increased signaling efficiency (i.e., fewer bits). The prediction syntax for AMVP may include a flag for the mode (in this case AMVP flag), the index for the candidate block, the MVD between the current motion vector and the predictive motion vector from the candidate block, the reference index, and the motion prediction direction.

Figure 4:
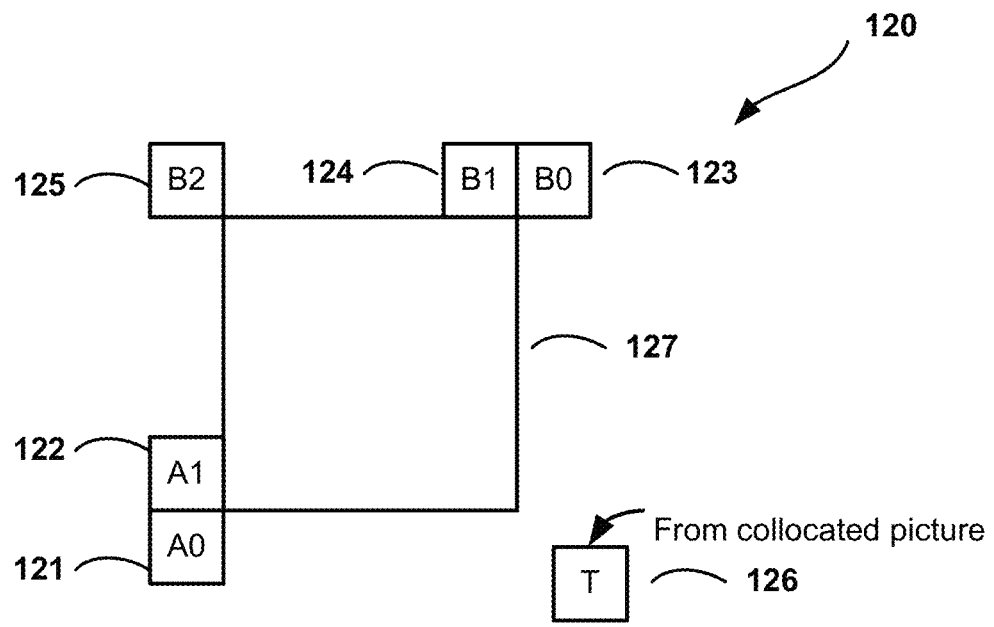
FIG. 4 shows an example set of candidate blocks that may be used in both merge mode and AMVP mode.

FIG. 4 shows an example set of candidate blocks 120 that may be used in both merge mode and AMVP mode. In this example, the candidate blocks are in the below left (A0) 121, left (A1) 122, left above (B2) 125, above (B1) 124, and right above (B0) 123 spatial positions, and in the temporal (T) 126 position(s). In this example, the left candidate block 122 is adjacent the left edge of the current block 127. The lower edge of the left block 122 is aligned with the lower edge of the current block 127. The above block 124 is adjacent the upper edge of the current block 127. The right edge of the above block 124 is aligned with the right edge of the current block 127.

Blocks $A_0$, $A_1$, $B_0$, $B_1$ and $B_2$ are commonly referred to as spatially neighboring blocks or spatially neighboring PUs. Video coder 20/30 may determine the locations of the spatially neighboring blocks by first determining the location of the top-left luma sample of the current PU (e.g. current block 127 in FIG. 4) relative to the top-left sample of the current picture. This luma location will be referred to as location (xP, yP). Video coder 20/30 may additionally determine the width of the luma PU (abbreviated nPSW) and the height of the luma PU (abbreviated nPSH). Based on the location of the top-left luma sample of the current PU and the height and width of the current PU, the location of a luma sample of the spatial neighboring blocks can be determined as follows:

block A0 includes the luma sample at location (xP−1, yP+nPSH);

block A1 includes the luma sample at location (xP−1, yP+nPSH−1);

block B0 includes the luma sample at location (xP+nPSW, yP−1);

block B1 includes the luma sample at location (xP+nPSW−1, yP−1);

block B2 includes the luma sample at location (xP−1, yP−1).

The spatial neighboring blocks may either be the same size or may be different sizes than the current PU.

A candidate list for use in merge mode can be derived using the spatial neighboring blocks discussed above. The motion vectors and the reference indices for both reference lists may be derived as specified by the following ordered steps, which are an example of a derivation process for spatial merging candidates. As part of the derivation process, video encoder 20 and video decoder 30 check the motion information of spatial neighboring PUs in the following order: $A_1$, $B_1$, $B_0$, $A_0$, or $B_2$. Video encoder 20 and video decoder 30 may perform constrained pruning in order to reduce or eliminate duplicate candidates from being added to the candidate list. Video coder 20/30 may derive the spatial candidates that are to be included in the merge mode candidate list as follows:

Video coder 20/30 inserts $A_1$ into the candidate list if $A_1$ is available.

If $B_1$ and $A_1$ have the same motion vectors and the same reference indices, then video coder 20/30 does not insert $B_1$ into the candidate list. If $B_1$ and $A_1$ do not have the same motion vectors and the same reference indices, then video coder 20/30 inserts $B_1$ into the candidate list, if $B_1$ is available.

If $B_0$ and $B_1$ have the same motion vectors and the same reference indices, then video coder 20/30 does not insert $B_0$ into the candidate list. If $B_0$ and $B_1$ do not have the same motion vectors and the same reference indices, then video coder 20/30 inserts $B_0$ into the candidate list, if $B_0$ available.

If $A_0$ and $A_1$ have the same motion vectors and the same reference indices, then video coder 20/30 does not insert $A_0$ into the candidate list. If $A_0$ and $A_1$ do not have the same motion vectors and the same reference indices, then video coder 20/30 inserts $A_0$ into the candidate list, if $A_0$ is available.

Video coder 20/30 inserts $B_2$ into the candidate list when both of the following conditions are not satisfied:

$B_2$ and $B_1$ or $B_2$ and $A_1$ have the same motion vectors and the same reference indices.

All of the four spatial merging candidates derived from $A_1$, $B_1$, $B_0$, $A_0$ are included in the candidate list.

Video coder 20/30 may derive the temporal candidate that is to be included in the merge mode candidate list as follows:

To get the temporal merging candidate, video coder 20/30 first identifies a co-located picture. If the current picture is a B slice, a syntax element "collocated_from_l0_flag" is signaled in the slice header to indicate whether the co-located picture is from RefPicList0 or RefPicList1.

After video coder 20/30 identifies a reference picture list, video coder 20/30 uses the syntax element collocated_ref_idx, signaled in slice header, to identify the picture in the picture in the list.

Video coder 20/30 then identifies a co-located PU by checking the co-located picture. Video coder 20/30 uses either the motion of the right-bottom PU of the CU containing this PU, or the motion of the right-bottom PU within the center PUs of the CU containing this PU as the temporal candidate.

When motion vectors identified by the above process are used to generate a motion candidate for merge mode, video coder 20/30 may need to scale the motion vectors based on the temporal location (reflected by picture order count, i.e., POC).

In HEVC, the PPS includes a flag enable_temporal_mvp_flag. When a particular picture with temporal_id equal to 0 refers to a PPS having enable_temporal_mvp_flag equal to 0, video coder 20/30 may mark all the reference pictures in the DPB "unused for temporal motion vector prediction," and no motion vector from pictures before that particular picture in decoding order would be used as a temporal motion vector predictor in decoding of the particular picture or a picture after the particular picture in decoding order.

If the current slice is a B slice and the total number of candidates derived from the spatial and temporal candidate derivation processes described above is less than the maximum number of candidates and greater than 1, then video coder 20/30 may invoke a process for generating bi-predictive candidates. Video coder 20/30 may derive the bi-predictive candidates that are to be included in the merge mode candidate list as follows:

Based on Table 1 below, to generate a combined bi-predictive candidate with index combIdx, the RefList0 motion information (MotList0) of the candidate list with entry equal to l0CandIdx if available and the RefList1 motion information (MotList1) of the candidate list with entry equal to l1CandIdx if available and not identical to MotList0 may be re-used by video coder 20/30 as the RefList0 and RefList1 motion information of the combined bi-predictive candidate.

TABLE 1

| Specification of l0CandIdx and l1CandIdx in HEVC | | | | | | | | | | | | |
|---|---|---|---|---|---|---|---|---|---|---|---|---|
| combIdx | 0 | 1 | 2 | 3 | 4 | 5 | 6 | 7 | 8 | 9 | 10 | 11 |
| l0CandIdx | 0 | 1 | 0 | 2 | 1 | 2 | 0 | 3 | 1 | 3 | 2 | 3 |
| l1CandIdx | 1 | 0 | 2 | 0 | 2 | 1 | 3 | 0 | 3 | 1 | 3 | 2 |

Video coder 20/30 may derive the zero motion vector candidates that are to be included in the merge mode candidate list if the total number of candidates derived from the above three processes described above for determining spatial, temporal, and bi-predictive candidates produces less than the maximum number of candidates. In such an instance, video coder 20/30 may insert a zero motion vectors for each reference picture into the candidate list. In HEVC WD 10, the total number of candidates in the merge (MRG) list is up to 5 and five_minus_max_num_merge_cand is signaled to specify the maximum number of the MRG candidates subtracted from 5 in slice header.

To further improve the coding efficiency for coding 3D video, two new technologies namely "inter-view motion prediction" and "inter-view residual prediction" have been introduced into 3D-HEVC. To enable these two coding tools, video coder 20/30 are configured to derive disparity vectors for a current block.

Video coder 20/30 can be configured to derive a disparity vector, using a technique referred to as Neighboring Blocks based Disparity Vector (NBDV), which utilizes disparity motion vectors from spatial and temporal neighboring blocks or a derived disparity vector from neighboring blocks to determine a disparity vector for a current block. In NBDV, video coder 20/30 checks the motion vectors of spatial or temporal neighboring blocks in a fixed checking order, and once a disparity motion vector is identified, i.e., the motion vector points to an inter-view reference picture, video coder 20/30 terminates the checking process. Video coder 20/30 returns the identified disparity motion vector and converts it to the disparity vector for the current block which can be used in inter-view motion prediction and inter-view residual prediction. If no disparity motion vector is found after checking all the pre-defined neighboring blocks, video coder 20/30 may use a zero disparity vector for the inter-view motion prediction, while inter-view residual prediction can be disabled for the corresponding prediction unit (PU).

The blocks used by video coder 20/30 for NBDV include spatial neighboring blocks and temporal neighboring blocks. Video coder 20/30 analyzes up to five spatial neighboring blocks as part of deriving the disparity vector. The five spatial neighboring blocks include the below-left block, left block, above-right block, above block, and above-left block of the current PU, denoted by $A_0, A_1, B_0, B_1$ or $B_2$. In this regard, the spatial neighboring blocks analyzed as part of NBDV may correspond to the same spatial neighboring blocks discussed above with respect to merge mode in FIG. 4, although the spatial neighboring blocks used for NBDV and candidate list construction for AMVP and merge modes do not necessarily have to be the same.

Video coder 20/30 also determines temporal neighboring blocks. Video coder 20/30 may treat all the reference pictures from current view as candidate pictures, or in some implementations, the number of candidate pictures can be further constrained, for example to four candidate pictures. Video coder 20/30 first checks a co-located reference picture and checks the rest of candidate pictures in, for example, the ascending order of reference index (refIdx). When both RefPicList0[refIdx] and RefPicList1 [refIdx] are available, RefPicListX[refIdx] precedes the other picture, wherein X is equal to collocated_from_l0_flag.

For each candidate picture, video coder 20/30 determines three candidate regions for deriving the temporal neighboring blocks. When a region covers more than one 16×16 block, video coder 20/30 can check all 16×16 blocks in such a region in, for example, raster scan order. The three candidate regions are defined as follows: (1) CPU—The co-located region of the current PU or current CU, (2) CLCU—The largest coding unit (LCU) covering the co-located region of the current PU, and (3) BR—Bottom-right 4×4 block of CPU.

It should be understood that the techniques described above for checking temporal neighboring blocks of reference pictures is one example. There may be other examples of reference pictures that are checked.

Figure 5:
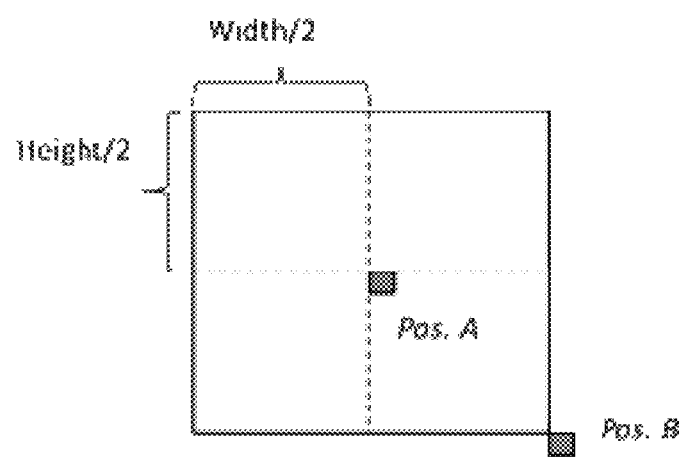
FIG. 5 shows an example of blocks that are checked in a candidate picture for determining a disparity vector for a current block.

FIG. 5 shows an example of blocks that are checked in a candidate picture for determining a disparity vector for a current block. For instance, video coder 20/30 may consider up to two candidate pictures from the current view. The first candidate picture from the current view may be the co-located picture identified as part of the construction of the candidate list (e.g., the temporal candidate). The second candidate picture may be a random-access picture or the reference picture with the smallest POC difference and smallest temporalId. In some examples, video coder 20/30 may first check the random-access picture, and if no disparity motion vector is found, check the co-located picture.

For each of these candidate pictures, video coder 20/30 may check two blocks. The first block may be the center block (CR), which may be the center 4×4 block of the co-located region of the current PU, as illustrated by Pos. A in FIG. 5. The second block may be the bottom right block (BR), which may be the bottom-right 4×4 block of the co-located region of the current PU, as illustrated by Pos. B in FIG. 5.

Video coder 20/30 may be configured to check the blocks in a specific order, i.e. a checking order. Video coder 20/30 may first check the spatial neighboring blocks, followed by temporal neighboring blocks. The checking order of the five spatial neighboring blocks may, for example, be defined as $A_1, B_1, B_0, A_0$ and $B_2$, or any other such order. For each candidate picture, video coder 20/30 can check the three candidate regions in the candidate picture in a checking order. The checking order of the three regions may, for example, defined as CPU, CLCU, and BR for the first non-base view, BR, CPU, and CLU for the second non-base view, or any other such order. In another example, for each candidate picture (e.g., where there are up to two candidate pictures), the two blocks are checked in order, CR and BR for the first non-base view or BR, CR for the second non-base view.

As described above, video coder 20/30 may determine the disparity vector for the current block by checking disparity motion vectors for neighboring blocks, and if a disparity motion vector for a neighboring block is found, converting that disparity motion vector as the disparity vector of the current block. In addition, in some examples, a derived disparity vector for a neighboring block may be used to determine the disparity vector for the current block. For example, a neighboring block may not be inter-predicted with a disparity motion vector, but a disparity vector for the neighboring block may have been derived during the prediction of the neighboring block. This derived disparity vector may be referred to as an implicit disparity vector (IDV) and may be used to determine the disparity vector for the current block, such as when none of the neighboring blocks that are checked are inter-predicted with a disparity motion vector.

For example, an implicit disparity vector (IDV) is generated when a PU employs inter-view motion vector prediction, i.e., the candidate for AMVP or merge modes is derived from a corresponding block in the other view with the help of a disparity vector. Such a disparity vector is called IDV. IDV is stored to the PU for the purpose of disparity vector derivation.

As described in more detail, video coder 20/30 may be configured to perform inter-view candidate derivation. Based on the disparity vector (DV), video coder 20/30 can determine a new motion vector candidate, referred to as an inter-view candidate, and add the new motion vector candidate to a candidate list for use in AMVP and skip/merge modes.

For instance, one example of the inter-view candidate derivation is an inter-view predicted motion vector candidate (IPMVC), and another example of the inter-view disparity motion vector candidate (IDMVC). The IPMVC includes motion information (e.g., motion vector and one or more reference indices for reference picture lists) for a reference block in a reference view referred to by a disparity vector of the current block, where the disparity vector for the current block is determined based on the above example technique. The IDMVC is the disparity vector converted to a disparity motion vector.

In some examples, video coder 20/30 may shift the disparity vector (e.g., by adding or subtracting an offset value from the disparity vector). Video coder 20/30 may derive additional IPMVCs and the IDMVCs based on the shifted disparity vector using similar technique as those without shifting the disparity vector. For example, video coder 20/30 may shift the disparity vector horizontally in one direction (e.g., by adding or subtracting a fixed offset value from the x-component of the disparity vector).

Video coder 20/30 may identify a reference block in a reference view identified by the disparity vector shifted by the offset value. The motion information for the reference block identified by the disparity vector shifted by the offset value may be one example of an additional IPMVC (i.e., in addition to the IPMVC derived without shifting the disparity vector). As another example, video coder 20/30 may shift the disparity vector, and may convert the shifted disparity vector as an additional IDMVC (i.e., in addition to the IDMVC derived without shifting the disparity vector).

In some examples, the amount by which video coder 20/30 may shift the disparity vector for deriving the IPMVC may be different than the amount by which video coder 20/30 may shift the disparity vector for deriving the IDMVC. In other words, video coder 20/30 may shift the disparity vector, for the current block, by a first offset value for deriving the additional IPMVC, and shift the disparity vector, for the current block, by a second, different offset value for deriving the additional IDMVC.

The first offset value or the second offset value may be considered as a vector that includes a horizontal shifted value and a vertical shifted value. For example, to shift the disparity vector by the first offset value for deriving the IPMVC, video coder 20/30 may add or subtract the disparity vector, for the current block, with a first vector that includes the horizontal shifted value and the vertical shifted value. Similarly, to shift the disparity vector by the second offset value for deriving the IDMVC, video coder 20/30 may add or subtract the disparity vector, for the current block, with a second vector that includes the horizontal shifted value and the vertical shifted value. In the techniques described in this disclosure, the first vector used to shift the disparity vector by a first offset value and the second vector used to shift the disparity vector by a second offset value may be different vectors. In some examples, vertical shifted value for the first or second offset values may be equal to 0 to achieve only horizontal shift in the disparity vector for deriving the IPMVC and the IDMVC.

Figure 6:
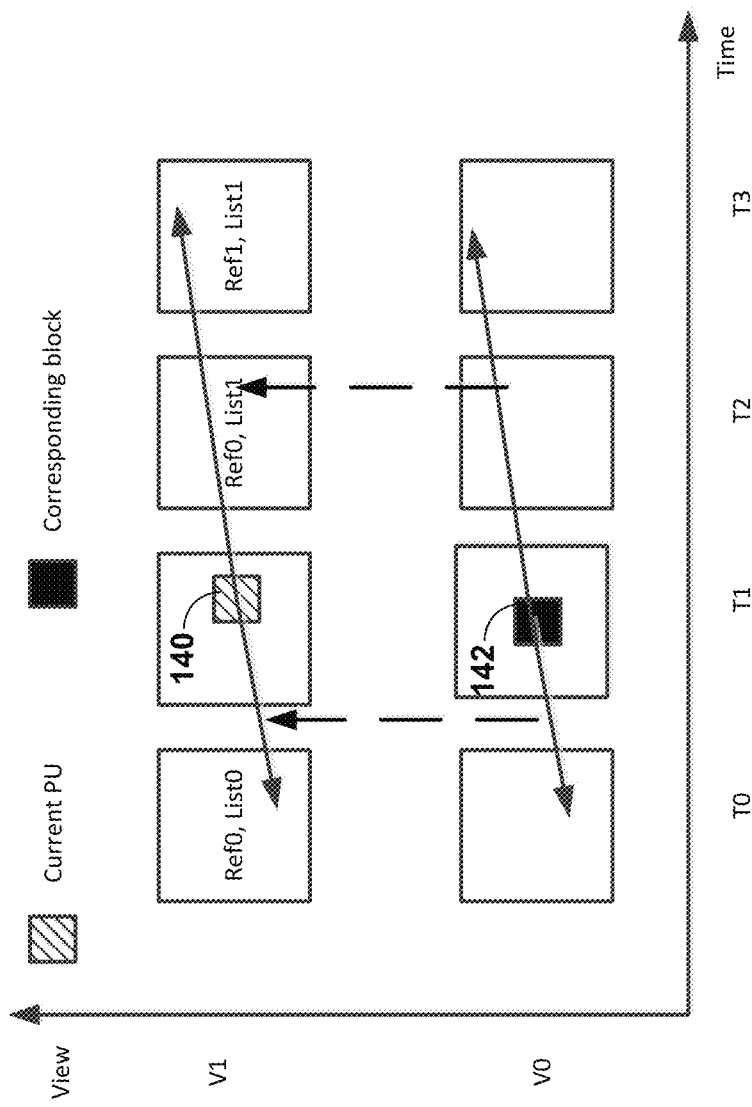
FIG. 6 is a conceptual diagram illustrating an example derivation process of an inter-view predicted motion vector candidate.

FIG. 6 shows an example of the derivation process of the inter-view predicted motion vector candidate (IPMVC). With a disparity vector (e.g., determined using the techniques described above), video coder 20/30 may locate corresponding block 142 in a different view (e.g., view 0 or V0, which is also a reference view) to current PU 140 in the currently coded view (view 1 or V1). If corresponding block 142, also referred to as a reference block, is not intra-coded and not inter-view predicted, and its reference picture has a POC value that is in the reference picture list of current PU 140 (e.g., Ref0, List 0; Ref0, List1; Ref1, List 1, as shown in FIG. 6), then the motion information (e.g., at least one of motion vector and reference picture indices) for corresponding block 142 is used as an inter-view predicted motion vector.

There may be certain requirements on whether motion information for corresponding block 142 (e.g., reference block) can be considered to be an IPMVC. In other words, there may be certain requirements to determine whether an IPMVC is available. One requirement may be that the motion vector for corresponding block 142 is a temporal motion vector. A temporal motion vector is a motion vector that refers to a picture in the same view. For instance, in FIG. 6, corresponding block 142 (e.g., reference block 142) is in view 0, and for corresponding block 142 to have a temporal motion vector the motion vector for corresponding block 142 would need to refer to pictures in the same view as corresponding block 142 (e.g., view 0). As illustrated in FIG. 6, the motion vectors for corresponding block 142 are temporal motion vectors since they refer to pictures in the same reference view (e.g., view 0) as corresponding block 142.

Another requirement may be that the temporal motion vector of the reference block (e.g., corresponding block 142) refers to a picture in the reference view with a picture order count (POC) value that is equal to a POC value of a picture in a reference picture list (e.g., RefPicList0 or RefPicList1) for the current block (e.g., current PU 140). As one illustrative example to assist with understanding, the reference picture lists for corresponding block 142 may identify the two pictures used to inter-predict corresponding block 142 as being located at a first reference index in RefPicList0 and a second reference index in RefPicList1. The POC values for the two pictures used to inter-predict corresponding block 142 may be POC X and POC Y. For the IPMVC to be considered as being available, at least one reference picture list (i.e., RefPicList0 or RefPicList1) should include pictures with POC values equal to POC X and POC Y. In other words, for the IPMVC to be considered as being available, the temporal motion vector for the reference block (e.g., corresponding block 142) needs to refer to a picture in the reference view (e.g., View 0) with a POC value that is equal to a POC value of a picture in a reference picture list for the current block (e.g., current PU 140)

For current PU 140, the pictures with POC values X and Y may not be located at the first reference index in RefPicList0 and the second reference index in RefPicList1, but may be instead located at a third reference index in RefPicList0 and a fourth reference index in RefPicList1, respectively. In this example, when the motion information of the corresponding block 142 are added as inter-view predicted motion vector candidate, video coder 20/30 may add the third reference index in RefPicList0 and the fourth reference index in RefPicList1 as the reference indices.

Additionally, video coder 20/30 may convert the disparity vector to an inter-view disparity motion vector, which may be added to the merge candidate list in a different position from IPMVC or added into the AMVP candidate list in the same position as IPMVC when it is available. Both the IPMVC and the inter-view Disparity Motion Vector Candidate (IDMVC) may be referred to as an 'inter-view candidate' in this context.

In AMVP mode, if the reference picture index refers to a temporal reference picture (e.g., the target reference index corresponds to a temporal motion vector), video coder 20/30 may derive the IPMVC and may not derive the IDMVC. For example, video coder 20/30 may find an IPMVC by checking the motion vector in the corresponding block (i.e., block 142) of the current PU (i.e., block 140) located by the disparity vector. If it is unavailable (i.e., no motion vector), video coder 20/30 may add a zero motion vector candidate to the candidate list. In AMVP mode, if the reference picture index refers to an inter-view reference picture (e.g., the target reference index corresponds to a disparity motion vector), video coder 20/30 may not derive and IPMVC, but instead, may convert the disparity vector to an inter-view disparity motion vector and add the converted disparity vector to the candidate list (i.e., add the inter-view disparity motion vector to the candidate list as the IDMVC).

In other words, if the current block is inter-predicted in AMVP mode, video coder 20/30 may determine whether to derive the IPMVC or the IDMVC based on whether the at least one reference picture index refers to a temporal reference picture or an inter-view reference picture. For example, in AMVP mode, video encoder 20 signals a reference picture index that video decoder 30 uses to identify the reference picture that is to be used for inter-prediction. In this way, video coder 20/30 may determine whether a reference picture index refers to a temporal reference picture or an inter-view reference picture. A temporal reference picture is a reference picture in the same view, and an inter-view reference picture is a reference picture in another, different view. In some example, if video coder 20/30 determines that the reference picture index refers to a temporal reference picture, video coder 20/30 may derive an IPMVC, and if video coder 20/30 determines that the reference picture index refer to an inter-view reference picture, video coder 20/30 may derive an IDMVC.

In the merge/skip mode, video coder 20/30 may always insert an IPMVC, if available, before all spatial and temporal merge candidates to the merge candidate list. Video coder 20/30 may, for example, insert the IPMVC before the spatial merging candidate derived from $A_0$, as shown above in FIG. 4. In some implementation of the 3D-HTM software, the inter-view predicted motion vector or inter-view disparity motion vector is always inserted before all spatial and temporal candidates in the AMVP candidate list.

As introduced above, video coder 20/30 may construct a merge candidate list in 3D-HEVC. Video coder 20/30 first derives a disparity vector using, for example, NBDV techniques described above. If such a disparity vector is not found, video coder 20/30 may utilize a zero disparity vector. With the disparity vector, video coder 20/30 constructs the merging candidate list as follows. Video coder 20/30 derives the IPMVC as described above, and if available, inserts the IPMVC into the merge list.

Video coder 20/30 may be configured to implement a derivation process for spatial merging candidates and IDMVC insertion. Video coder 20/30 may, for example, check the motion information of spatial neighboring PUs in the following order: $A_1$, $B_1$, $B_0$, $A_0$, or $B_2$. Video coder 20/30 may perform constrained pruning by the following procedures:

Insert $A_1$ to the candidate list if available and it is different from IPMVC.

If $B_1$ and $A_1$/IPMVC have the same motion vectors and the same reference indices, $B_1$ is not inserted into the candidate list. Otherwise, insert $B_1$ to the candidate list if available.

If $B_0$ and $B_1$ have the same motion vectors and the same reference indices, $B_0$ is not inserted into the candidate list. Otherwise, insert $B_0$ to the candidate list if available.

IDMVC is derived by the procedure described above. If it is available and it is different from the candidates derived from $A_1$ and $B_1$, it is inserted to the candidate list.

If $A_0$ and $A_1$ have the same motion vectors and the same reference indices, $A_0$ is not inserted into the candidate list. Otherwise, insert $A_0$ to the candidate list if available.

$B_2$ is inserted to the candidate list when both of the following conditions are not satisfied:

$B_2$ and $B_1$ or $B_2$ and $A_1$ have the same motion vectors and the same reference indices.

All of the four spatial merging candidates derived from $A_1$, $B_1$, $B_0$, $A_0$ and IPMVC are included in the candidate list.

Video coder 20/30 may also be configured to implement a derivation process for temporal merging candidate. This derivation process may, for example, be the same procedure as defined in HEVC, which is briefly discussed above.

Video coder 20/30 may also be configured to implement a derivation process for combined bi-predictive merging candidates. For example, if the total number of candidates derived from the above two steps is less than the maximum number of candidates, video coder 20/30 may perform the same process as defined in HEVC except the specification of l0CandIdx and l1CandIdx. The relationship among combIdx, l0CandIdx and l1CandIdx are defined in the following table:

Video coder 20/30 may also be configured to implement a derivation process for zero motion vector merging candidates. Video coder 20/30 may, for example, implement the same procedure as defined in HEVC.

In the latest software, the total number of candidates in the merge (MRG) list is up to 6 and the syntax element "five_minus_max_num_merge_cand" is signaled to specify the maximum number of the MRG candidates subtracted from 6 in slice header. It should be noted that five_minus_max_num_merge_cand is in the range of 0 to 5, inclusive. As noted above, in WD10 the total number of candidate in the MRG list is up to 5.

In addition to the methods described above, according to other proposals merge candidates derivation from a disparity vector, the following technique was also proposed in JCT3V-B0048 by Zhang et. al, entitled "3D-CE5.h: Merge candidates derivation from disparity vector" Oct. 15, 2012, available from, as of 4 Dec. 2013, http://phenix.it-sudparis.eu/jct2/doc_end_user/current_document.php?id=237. The corresponding block (i.e., reference block) identified by the disparity vector in a reference view is used to derive IPMVC as current method. Its left and right PUs of the PU containing the corresponding block are located and two shifted disparity vectors are derived if applicable. Left shifted Disparity Vector (LDV): subtract the disparity vector by the width of the left PU for the horizontal component. Right shifted Disparity Vector (RDV): add the disparity vector by the width of the PU containing the corresponding block in the horizontal component. The usage of the LDV/RDV to derive IPMVCs is the same as the disparity vector in the current 3D-HEVC. If the derived IPMVC is available, it is added into the merge candidate list, otherwise, the shifted disparity vector is converted to a disparity motion vector to be added into the merge candidate list.

The current design of motion related technologies in HEVC based multiview/3DV coding has several potential problems due to the fact that the derived disparity vector might not be accurate enough. As one example, an inaccurate disparity vector may lead to inaccurate inter-view predicted motion vector candidates and inter-view disparity motion vector candidates. As another example, utilization of the left/right PUs of the corresponding block in a reference view to derive IPMVCs may not be friendly to hardware implementation since the access to the left/right PUs needs to shift from the corresponding block with its width which is variable. As another example, to prune the reduplicated candidates, all reference indices and motion vectors are required to be checked which introduces too much complexity.

This disclosure introduces various techniques that may improve the disparity vector accuracy as well as the accuracy of inter-view predicted motion vectors and inter-view disparity motion vectors. According to one technique of this disclosure, video coder 20/30 may derive more IPMVCs from the reference view from shifted disparity vectors with a fixed offset value for all PUs within one slice/picture/sequence. In one example, video coder 20/30 may shift horizontally the disparity vector by $-4*M$ (M is a positive integer, such as 1, 2, 4, 8) and/or $4*M$ (corresponding to M pixels). With the shifted disparity vector, video coder 20/30 may use the PUs located at the left and/or the right side of the PU containing the corresponding block to generate IPMVCs similar to the IPMVC generation process from the corresponding block.

According to another technique of this disclosure, video coder 20/30 may convert more IDMVCs with shifted disparity vectors. In one example, the shifted value (i.e., offset value) is $-4*N$ (N is a positive integer, such as 1, 2, 4, 8)

TABLE 2

Specification of l0CandIdx and l1CandIdx in 3D-HEVC

| combIdx | 0 | 1 | 2 | 3 | 4 | 5 | 6 | 7 | 8 | 9 | 10 | 11 | 12 | 13 | 14 | 15 | 16 | 17 | 18 | 19 |
| --- | --- | --- | --- | --- | --- | --- | --- | --- | --- | --- | --- | --- | --- | --- | --- | --- | --- | --- | --- | --- |
| l0CandIdx | 0 | 1 | 0 | 2 | 1 | 2 | 0 | 3 | 1 | 3 | 2 | 3 | 0 | 4 | 1 | 4 | 2 | 4 | 3 | 4 |
| l1CandIdx | 1 | 0 | 2 | 0 | 2 | 1 | 3 | 0 | 3 | 1 | 3 | 2 | 4 | 0 | 4 | 1 | 4 | 2 | 4 | 3 | and/or 4*N (corresponding to N pixels) horizontally. In one example, furthermore, the shifted value (i.e., offset value) for deriving IPMVC and IDMVC could be different, i.e., N is different from M.

According to another technique of this disclosure, for each mutation based on a disparity vector (i.e., each shifting of the disparity vector), video coder 20/30 may generate only one additional candidate, and the candidate is either from IPMVC based on a first shifted disparity vector or the IDMVC based on a second shifted disparity vector. If IPMVC is available, video coder 20/30 may use it as the additional candidate. If IPMVC is added into the merge candidate list, video coder 20/30 may not convert IDMVC. In one example, if IDMVC is available, video coder 20/30 may not derive IPMVC. In another example, two of them, if available can be derived as additional candidates.

In other words, if the current block is inter-predicted in merge mode or skip mode, video coder 20/30 may determine the availability of the IPMVC, where the IPMVC is motion information (e.g., motion vector and one or more reference indices) for a reference block in a reference view referred to by a disparity vector, for the current block, shifted by an offset value. For example, video coder 20/30 may determine that the IPMVC is available if the motion vector for the reference block is a temporal motion vector that refers to a picture in the reference view with a picture order count (POC) value that is equal to a POC value of a picture in a reference picture list for the current block.

In such an example, video coder 20/30 may derive the IPMVC for possible inclusion in the candidate list (subject to pruning described below), and may avoid the deriving of the IDMVC (i.e., avoiding the deriving of the IDMVC). For instance, in this example, video coder 20/30 may prioritize IPMVC over IDMVC, if the current block is inter-predicted in merge or skip mode, where if the IPMVC is available, video coder 20/30 may derive the IPMVC, and may not derive the IDMVC (i.e., avoid the deriving of the IDMVC).

According to another technique of this disclosure, for each mutation based on a disparity vector, the first shifted disparity vector used for derivation of IPMVC and the second shifted disparity vector used for conversion of IPMVC can have different offset values, where the offset values indicate the amount by which video coder 20/30 shifts the disparity vector. For example, the offset value for the first shifted disparity vector is 16 and the offset for the second shifted disparity vector is 4. In some examples, both shifted disparity vectors should be in horizontal direction and in the same direction, meaning the sign values of the offsets are the same. In one example, there are only two mutations, one to the left and one to the right. Alternatively, there is only one mutation to the left. Alternatively, there is only one mutation to the right. According to another technique of this disclosure, each of the candidates may be inserted into any position of the candidate list.

As one example, if video coder 20/30 derives the IPMVC, the motion information for the IPMVC may include a motion vector (e.g., temporal motion vector) for a reference block in a reference view referred to by a disparity vector, for the current block, shifted by a first offset value. Also, the motion vector of the IPMVC may refer to a picture in the same view (e.g., a temporal reference picture) whose POC value is equal to a POC value of a picture identified in a reference picture list of the current block. If video coder 20/30 derives the IDMVC, the IDMVC may be the disparity vector, for the current block, shifted by a second, different offset value. In some examples, video coder 20/30 may add the first offset value to or subtract the first offset value from the disparity vector to determine the disparity vector shifted by the first offset value. In some example, video coder 20/30 may add the second offset value to or subtract the second offset value from the disparity vector to determine the disparity vector shifted by the second offset value.

According to another technique of this disclosure, type-based pruning may be applied for each of the newly added motion vector candidate, even including the one derived from the first disparity vector. Video coder 20/30 may apply the pruning process for two candidates only when the reference picture types (inter-view reference pictures or temporal reference pictures) are the same. In this case, when the type of reference picture corresponding to either RefPicList0 or RefPicList1 is different from that of a to-be-compared candidate, no comparison of the reference indices and motion vectors is needed (i.e., video coder 20/30 may not perform the comparison of reference indices and motion vectors if the type of reference picture referred to by a first candidate is different than a second candidate). Video coder 20/30 may apply the pruning process for two inter-view candidates only when they are both IDMVCs or IPMVCs.

For instance, in addition to deriving an IPMVC and an IDMVC based on shifted disparity vectors, video coder 20/30 may derive an IPMVC and an IDMVC based on the disparity vector for the current block without shifting the disparity vector. As one example, assume that a first IPMVC is a motion vector for a first reference block referred to by a disparity vector, for the current block, shifted by an offset value. In some examples, video coder 20/30 may include a second IPMVC in the candidate list, where the second IPMVC is a motion vector for a second reference block in the reference view referred to by the disparity vector without shifting the disparity vector.

Video coder 20/30 may compare motion information of the first IPMVC and the motion information of the second IPMVC such as the motion vector, the reference picture index, and reference picture list. In some examples, video coder 20/30 may compare the motion information of the first IPMVC only with the motion information of the second IPMVC, and with no other candidates in the candidate list. If video coder 20/30 determines that the motion information of the first IPMVC and the motion information of the second IPMVC is the same (e.g., the motion vectors are the same or both the motion vectors and the reference picture indices are the same), video coder 20/30 may determine that the first IPMVC is not to be included in the candidate list. If video coder 20/30 determines that the motion information of the first IPMVC and the motion information of the second IPMVC is different (e.g., the motion vectors are different, the motion vectors are the same, but the reference picture indices are different, the motion vectors are different, but the reference picture indices are different, or both the motion vectors and the reference picture indices are different), video coder 20/30 may determine that the first IPMVC is to be included in the candidate list.

In some examples, the second IPMVC, of the above example, may always be included in the candidate list. In such examples, the pruning technique (e.g., comparing the first IPMVC and the second IPMVC and in some examples only with the second IPMVC) may determine whether or not to include the first IPMVC in the candidate list.

According to another technique of this disclosure, the above techniques may only apply when the disparity vector is available after NBDV. If no disparity vector is found after NBDV, video coder 20/30 may not apply the above techniques of shifting the disparity vector for deriving additional IPMVCs and IDMVCs (the above shall not be applied). In one example, IPMVCs derived with above methods always apply. However, the newly derived IDMVCs are inserted to the merge candidate list only when the disparity vector is available with NBDV.

Furthermore, in merge and skip mode, video coder 20/30 may derive an IPMVC from a disparity vector, for a current block, shifted by a first offset value, if the IPMVC is available, and derive the IDMVC from the disparity vector, for the current block, shifted by a second, different offset value if the IPMVC is determined to be not available. Also, in AMVP mode, video coder 20/30 may derive either the IPMVC or the IDMVC based on the reference picture index. Accordingly, in some examples, only one of the IPMVC or the IDMVC is included in the candidate list.

The various techniques introduced above may be implemented by video coder 20/30. Various example implementations of the techniques introduced above will now be discussed. The disparity vector may be derived according to HEVC methods. However, more candidates may be derived based on the disparity vector for skip/merge modes or AMVP mode.

According to one aspect of this disclosure, video coder 20/30 may be configured to perform mutation of disparity vector for IPMVCs and IDMVCs. Based on the disparity vector, two mutations of disparity vectors are used to derive IPMVCs and IDMVCs. The mutation of the left and/or right shifted Disparity Vector (LDV and/or RDV) for the derivation of IPMVCs is achieved by adding the disparity vector by −16 and/or 16 in the horizontal component. The mutation of the left and/or right shifted Disparity Vector (LDV and/or RDV) for the derivation of IDMVCs is achieved by adding the disparity vector by −4 and/or 4 in the horizontal component.

Video coder 20/30 may derive IPMVCs from mutated disparity vectors. With the shifted disparity vectors, two additional IPMVCs may be derived in the same way as the IPMVC in current method. The two newly derived IPMVCs with LDV and RDV are denoted by left IPMVC and right IPMVC, respectively. For simplicity, the IPMVCs (temporal motion candidates) derived from the LDV and RDV are named LTMV and RTMV respectively.

Video coder 20/30 may derive IDMVCs from mutated disparity vectors. With the shifted disparity vectors, two additional IDMVCs may be derived in the same way as the IDMVC in current method. The two newly derived IDMVCs with LDV and RDV are denoted by left IDMVC and right IDMVC, respectively. For simplicity, the IDMVCs (disparity motion vector candidates) derived from the LDV and RDV are named LDMV and RDMV respectively. Based on a mutated disparity vector, either LDV or RDV, one and only one candidate is derived, either LTMV (RTMV) or LDMV (RDMV). Such a candidate is denoted as LMV when derived from LDV, or RMV when derived from RDV. An LMV may be derived as follows: if LTMV is available: LMV is set to LTMV; otherwise, LMV is set to LDMV. An RMV may be derived as follows: if RTMV is available: RMV is set to RTMV; otherwise, RMV is set to RDMV.

Video coder 20/30 may apply the following checking and pruning process after the IPMVCs and IDMVCs are generated by shifting the disparity vectors. The newly derived left IPMVC is compared to the IPMVC derived with the disparity vector without mutation, the spatial merging candidate from $A_1$ or $B_1$ in order, if available. If it is equal to any of these three candidates, it is removed from the merge candidate list. Otherwise, it is added to the merging candidate list after all spatial merging candidates, thus, before the temporal merging candidate.

If the left IPMVC is not added to the merging candidate list, the newly derived left IDMVC is compared to the spatial merging candidate from A1 or B1 in order, if available. If it is equal to either of these two candidates, it is removed from the merge candidate list. Otherwise, it is added to the merging candidate list in the same position as left IPMVC, if available, i.e., after all spatial merging candidates thus, before the temporal merging candidate.

The newly derived right IPMVC is compared to the IPMVC derived with the disparity vector without mutation, the spatial merging candidate from A1 or B1, the left IPMVC in order, if available. If it is equal to any of these four candidates, it is removed from the merge candidate list. Otherwise, it is added to the merging candidate list after all spatial merging candidates and the left IPMVC or the left IDMVC.

If the right IPMVC is not added to the merging candidate list, the newly derived right IDMVC is compared to the spatial merging candidate from A1 or B1 in order, if available. If it is equal to either of these two candidates, it is removed from the merge candidate list. Otherwise, it is added to the merging candidate list in the same position as right IPMVC, if available, i.e., after all spatial merging candidates and the left IPMVC or the left IDMVC.

In one alternative, only when two candidates have the same type, i.e., they are disparity motion vectors or they are temporal motion vectors, are compared. For example, if the candidate derived from A1 has a temporal reference picture, the comparison between it and the left/right IDMVC is not needed.

Video coder 20/30 may be configured to implement alternatives of various aspects described above. For example, video coder 20/30 may be configured to determine insertion positions for newly derived candidates. In contrast to the example described above, where the newly derived candidates are inserted after all spatial merging candidates and candidate (either IPMVC or IDMVC) derived from LDV precedes that derived from RDV, the following positions and orders may be applied:

After a subset of the spatial merging candidates.

Alternatively, after all spatial, temporal candidates and the candidates derived by the disparity vector, thus before the combined candidates.

Alternatively, the IPMVC derived with shifted value equal to −4*M, if available, is inserted before the IDMVC derived with shifted value equal to −4*N. The IPMVC derived with shifted value equal to 4*M, if available, is inserted before the IDMVC derived with shifted value equal to 4*N.

Alternatively, all the IPMVCs derived with shifted values are inserted to the list, following the IPMVC derived from the disparity vector, thus before all spatial merging candidates.

Alternatively, all the IDMVCs derived with shifted values are inserted to the list, following the IDMVC derived from the disparity vector, thus before the spatial merging candidates derived from $A_0$ and $B_2$.

In one alternative, the newly added IPMVCs and/or IDMVCs could be inserted to the candidate list in any position and in any order.

Furthermore, the candidate derived from RDVs precedes that derived from LDVs.

Alternatively, the candidate derived from LDVs and RDVs may not be inserted consecutively. Instead, the candidate derived from LDV may be inserted right after the last spatial merging candidate and right before the temporal merging candidate while the candidate derived from RDV may be inserted right after the temporal merging candidate, and vice versa.

Video coder 20/30 may be configured to perform a pruning process other than the pruning process described above. For example, video coder 20/30 may be configured to apply the following pruning process.

Only one or more selective spatial candidates (e.g., A1) is compared to the newly derived candidates.
 a. For example, the newly derived candidates (LMV and/or RMV) are compared to only the spatial merge candidate from $A_1$.
 b. For example, the newly derived candidates (LMV and/or RMV) are compared to only the spatial merge candidate from $B_1$.

Alternatively, the newly derived candidates are not compared to any spatial or temporal candidate.

In addition, the newly added motion vector candidates, excluding those derived from the disparity vector needed to be compared with each other to avoid duplications.

Alternatively, the newly added motion vector candidates, including those derived from the disparity vector needed to be compared with each other to avoid duplications.

Alternatively, the newly added motion vector candidates are only compared to those derived from the disparity vector to avoid duplications and they are not compared with each other.

In one alternative, newly added IDMVCs and/or IPMVCs need to be compared with all or subset of available merging candidates.

Alternatively, in addition, if a derived candidate from RDV or LDV (LMV and/or RMV) is a disparity motion vector, it is never compared to IDMVC.

In one alternative, when the reference blocks located with the shifted disparity vectors (−4*M/4*M) and the reference block located with the disparity vector belong to the same PU, the pruning process among the newly added IPMVCs and the one derived from the disparity vector may be skipped and the newly added IPMVCs are removed from the merge candidate list.
 a. In one alternative, furthermore, IDMVC derived from shifted disparity vectors (−4*N/4*N) is not added to the merge candidate list.
 b. In another alternative, furthermore, IDMVC derived from shifted disparity vectors (−4*N/4*N) is not added to the merge candidate list.

As part of the pruning process, video coder 20/30 may perform one or more comparisons as introduced above. In one example, the following (up to five) motion vector candidate pairs (if both of them are available) are compared:
 When LTMV is available, (LMV, IPMVC derived from the disparity vector); (LMV, Spatial merging candidate from $B_1$);
 When RTMV is available, (RMV, IPMVC derived from the disparity vector); (RMV, Spatial merging candidate from $B_1$);
 When both LTMV and LTMV are available, (RMV, LMV)

If a condition is given in a given candidate pair, e.g., "When LTMV is available", it means that the corresponding pair is not compared if the condition is not true.

Note that for each candidate pair (C0, C1), if they are different, C0 is inserted into the merge candidate list, otherwise, C0 is not further inserted into merge the candidate list. In addition, if C1 is not in the merge candidate list, the comparison is avoided. Assume the reference indices and motion vectors of C0 and C1 are RefIdxLXC0, mvLXC0 and RefIdxLXC1, mvLXC1 respectively, with X being equal to 0 and 1. C0 and C1 are considered different if one or more of the following conditions are true:
 For the prediction list indication X being 0 and 1,
  RefIdxLXC0 is not equal to RefIdxLXC1;
  mvLXC0[0] is not equal to mvLXC1[0] when Ref1dxLXC0 unequal to −1;
  mvLXC0[1] is not equal to mvLXC1[1] when RefIdxLXC0 unequal to −1;

Note, If a motion vector is not available for a given prediction list indication X, the corresponding reference index may be considered to be equal to −1.

In a second example, the following (up to 2) motion vector candidate pairs (if both of them are available) are compared:
 When LTMV is available, (LMV, IPMVC derived from the disparity vector)
 When RTMV is available, (RMV, IPMVC derived from the disparity vector).

In a third example, the following motion vector candidate pairs (if both of them are available) are compared:
 When LTMV is available, (LMV, IPMVC derived from the disparity vector); (LMV, Spatial merging candidate from $B_1$);
 When RTMV is available, (RMV, IPMVC derived from the disparity vector) (RMV, Spatial merging candidate from $B_1$).

In a fourth example, the following motion vector candidate pairs (if both of them are available) are compared:
 When LTMV is available, (LMV, IPMVC derived from the disparity vector); (LMV, Spatial merging candidate from $A_1$);
 When RTMV is available, (RMV, IPMVC derived from the disparity vector) (RMV, Spatial merging candidate from $A_1$)

In a fifth example, the following (up to five) motion vector candidate pairs (if both of them are available) are compared:
 When LTMV is available, (LMV, IPMVC derived from the disparity vector); (LMV, Spatial merging candidate from $A_1$);
 When RTMV is available, (RMV, IPMVC derived from the disparity vector); (RMV, Spatial merging candidate from $A_1$);
 When both LTMV and LTMV are available, (RMV, LMV)

Figure 7:
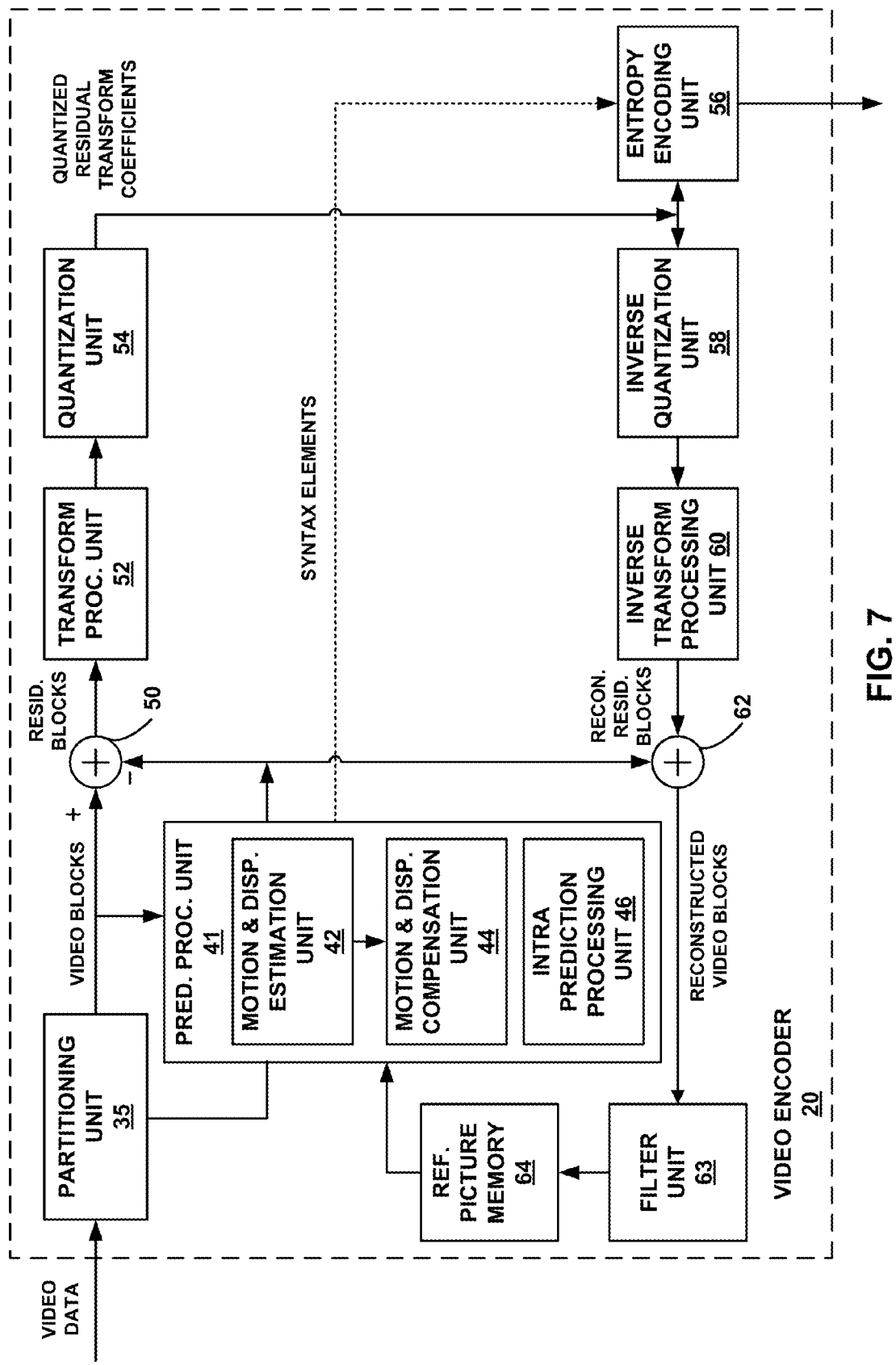
FIG. 7 is a block diagram illustrating an example of a video encoder that may implement the inter-prediction techniques of this disclosure.

FIG. 7 is a block diagram illustrating an example video encoder 20 that may implement the techniques described in this disclosure, including the inter-view prediction techniques described above. Video encoder 20 may perform intra- and inter-coding of video blocks within video slices. Intra-coding may be referred to as intra-prediction encoding, and inter-coding may be referred to as inter-prediction encoding, when performed by video encoder 20. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Inter-coding may also refer to inter-view coding where a picture in another view is used as a reference picture for encoding a current block in a current picture in a current view. Intra-mode (I mode) may refer to any of several spatial based compression modes. Inter-modes, such as uni-directional prediction (P mode) or bi-prediction (B mode), may refer to any of several temporal-based compression modes or inter-view compression modes.

In the example of FIG. 7, video encoder 20 includes a partitioning unit 35, prediction processing unit 41, filter unit 63, reference picture memory 64, summer 50, transform unit 52, quantization unit 54, and entropy encoding unit 56. Prediction processing unit 41 includes motion and disparity estimation unit 42, motion and disparity compensation unit 44, and intra prediction processing unit 46. For video block reconstruction, video encoder 20 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 7 as being an in loop filter, in other configurations, filter unit 63 may be implemented as a post loop filter.

As shown in FIG. 7, video encoder 20 receives video data, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-predictive coding of the current video block relative to one or more neighboring blocks in the same frame or slice as the current block to be coded to provide spatial compression. Motion and disparity estimation unit 42 and motion and disparity compensation unit 44 within prediction processing unit 41 perform inter-predictive coding and/or inter-view coding of the current video block relative to one or more predictive blocks in one or more reference pictures and/or reference views to provide temporal or view compression.

Motion and disparity estimation unit 42 may be configured to determine the inter-prediction mode and/or inter-view prediction mode for a video slice according to a predetermined pattern for a video sequence. The predetermined pattern may designate video slices in the sequence as P slices, or B slices. Motion and disparity estimation unit 42 and motion and disparity compensation unit 44 may be highly integrated, but are illustrated separately for conceptual purposes. Motion and disparity estimation, performed by motion and disparity estimation unit 42, is the process of generating motion vectors, which estimate motion for video blocks. A motion vector, for example, may indicate the displacement of a PU of a video block within a current video frame or picture relative to a predictive block within a reference picture. Disparity estimation, performed by motion and disparity estimation unit 42, is the process of generating disparity motion vectors, which may be used to predict a currently coded block from a block in a different view.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion and disparity estimation unit 42 may perform a motion search relative to the full pixel positions and fractional pixel positions and output a motion vector with fractional pixel precision.

Motion and disparity estimation unit 42 calculates a motion vector (for motion compensated prediction) and/or a disparity motion vector (for disparity compensated prediction) for a PU of a video block in an inter-coded or interview predicted slice by comparing the position of the PU to the position of a predictive block of a reference picture. The reference picture may be selected from a first reference picture list (RefPicList0) or a second reference picture list (RefPicList1), each of which identify one or more reference pictures stored in reference picture memory 64. Motion and disparity estimation unit 42 sends the calculated motion vector and/or disparity vector to entropy encoding unit 56 and motion compensation unit 44.

Motion compensation and/or disparity compensation, performed by motion and disparity compensation unit 44, may involve fetching or generating the predictive block based on the motion vector determined by motion estimation and/or disparity estimation, possibly performing interpolations to sub-pixel precision. Upon receiving the motion vector and/or disparity for the PU of the current video block, motion and disparity compensation unit 44 may locate the predictive block to which the motion vector and/or disparity vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion and disparity compensation unit 44 may also generate syntax elements associated with the video blocks and the video slice for use by video decoder 30 in decoding the video blocks of the video slice.

Intra-prediction processing unit 46 may intra-predict a current block, as an alternative to the inter-prediction performed by motion and disparity estimation unit 42 and motion and disparity compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 may select an appropriate intra-prediction mode to use from the tested modes. For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy coding unit 56. Entropy coding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied to transform unit 52. Transform unit 52 transforms the residual video data into residual transform coefficients using a transform, such as a discrete cosine transform (DCT) or a conceptually similar transform. Transform unit 52 may convert the residual video data from a pixel domain to a transform domain, such as a frequency domain.

Transform unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion and disparity compensation unit 44 may calculate a reference block by adding the residual block to a predictive block of one of the reference pictures within one of the reference picture lists. Motion and disparity compensation unit 44 may also apply one or more interpolation filters to the reconstructed residual block to calculate sub-integer pixel values for use in motion estimation. Summer 62 adds the reconstructed residual block to the motion compensated prediction block produced by motion and disparity compensation unit 44 to produce a reference block for storage in reference picture memory 64. The reference block may be used by motion and disparity estimation unit 42 and motion and disparity compensation unit 44 as a reference block to inter-predict a block in a subsequent video frame or picture.

Figure 8:
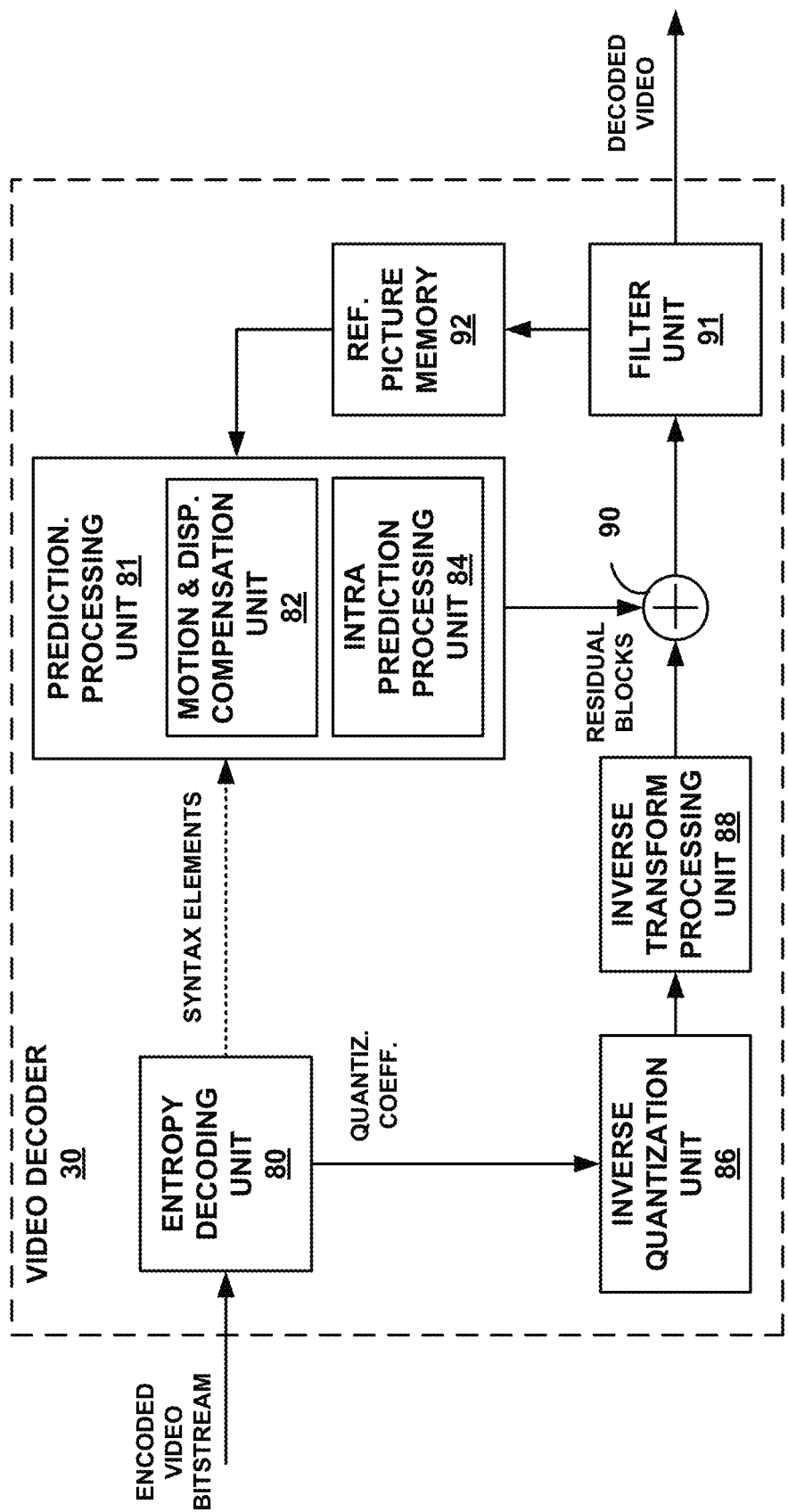
FIG. 8 is a block diagram illustrating an example of a video decoder that may implement the inter-prediction techniques of this disclosure.

FIG. 8 is a block diagram illustrating an example video decoder 30 that may implement the techniques described in this disclosure, including the inter-view prediction techniques described above. In the example of FIG. 8, video decoder 30 includes an entropy decoding unit 80, prediction processing unit 81, inverse quantization unit 86, inverse transformation processing unit 88, summer 90, filter unit 91, and reference picture memory 92. Prediction processing unit 81 includes motion and disparity compensation unit 82 and intra prediction processing unit 84. Video decoder 30 may, in some examples, perform a decoding pass generally reciprocal to the encoding pass described with respect to video encoder 20 from FIG. 7.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter-coded (i.e., B, P or GPB) slice, motion and disparity compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion and disparity compensation unit 82 determines prediction information for a video block of the current video slice by parsing the motion vectors and other syntax elements, and uses the prediction information to produce the predictive blocks for the current video block being decoded. For example, motion and disparity compensation unit 82 uses some of the received syntax elements to determine a prediction mode (e.g., intra- or inter-prediction) used to code the video blocks of the video slice, an inter-prediction or inter-view prediction slice type (e.g., B slice or P slice), construction information for one or more of the reference picture lists for the slice, motion vectors and/or disparity vectors for each inter-encoded video block of the slice, inter-prediction status for each inter-coded video block of the slice, and other information to decode the video blocks in the current video slice.

In some examples, motion and disparity compensation unit 82 may determine the signaled syntax elements indicating motion vectors using a motion vector prediction process. The motion vector prediction processes may include an AMVP mode and a merge mode. Motion and disparity compensation unit 82 may also perform interpolation based on interpolation filters. Motion and disparity compensation unit 82 may use interpolation filters as used by video encoder 20 during encoding of the video blocks to calculate interpolated values for sub-integer pixels of reference blocks. In this case, motion and disparity compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion and disparity compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion and disparity compensation unit 82. Summer 90 represents the component or components that perform this summation operation. If desired, loop filters (either in the coding loop or after the coding loop) may also be used to smooth pixel transitions, or otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 8 as being an in loop filter, in other configurations, filter unit 91 may be implemented as a post loop filter. The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 1.

Figure 9:
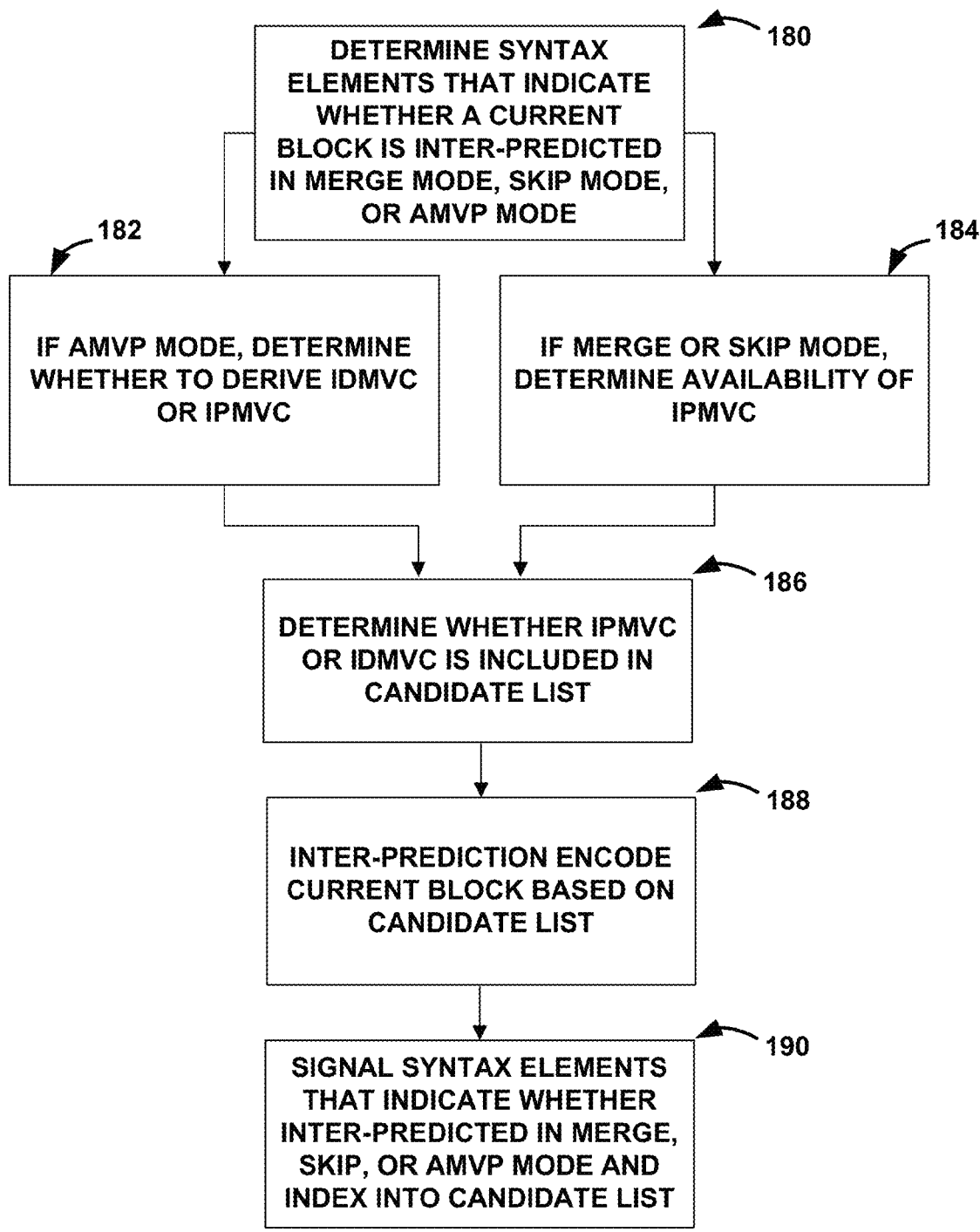
FIG. 9 is a flowchart showing an example encoding process according to the techniques of the disclosure.

FIG. 9 is a flowchart showing an example encoding process according to the techniques of the disclosure. The techniques of FIG. 9 will be described with respect to video encoder 20 but may be performed by other types of video encoders. Video encoder 20 determines whether a current block is inter-predicted in merge mode, skip mode, or AMVP mode (180).

If the current block is inter-predicted in AMVP mode, video encoder 20 may determine whether to derive an IDMVC or an IPMVC based on a reference picture index (182). For example, if the reference picture index refers to a temporal reference picture, video encoder 20 may determine an IPMVC, and if the reference picture index refers to an inter-view reference picture, video encoder 20 may determine an IDMVC.

If the current block is inter-predicted in merge mode or skip mode, video encoder 20 may determine availability of the IPMVC (184). Video encoder 20 may determine that the IPMVC is available if motion information for a reference block referred to by a disparity vector, of the current block, shifted by an offset value includes a motion vector that is a temporal motion vector that refers to a picture in the reference view with a POC value equal to a POC value of a picture identified in a reference picture list of the current block. As described above, the IPMVC may be motion information of a reference block in a reference view referred to by a disparity vector, for the current block, shifted by a first offset value, and the IDMVC may be a disparity vector, for the current block, shifted by a second, different offset value.

In some examples, if IPMVC is available, video encoder 20 may derive the IPMVC, and avoid the deriving of the IDMVC in merge or skip mode. If IPMVC is not available and the current block is inter-predicted in merge mode or skip mode, video encoder 20 may derive the IDMVC.

Video encoder 20 may determine whether the IPMVC or the IDMVC is to be included in a candidate list (186). In some examples, video encoder 20 may include only one of the IPMVC and the IDMVC, and not both (i.e., only one of the IPMVC and the IDMVC is included in the candidate list). For instance, in merge mode, if video encoder 20 derives the IPMVC because the IPMVC is available, video encoder 20 may avoid the deriving of the IDMVC. In AMVP mode, video encoder 20 may include one of the IPMVC or the IDMVC in a candidate list based on whether the reference picture index refer to a temporal reference picture or an inter-view reference picture.

Also, in some example, video encoder 20 may derive another IPMVC based on the disparity vector without shifting the disparity vector. In these examples, video encoder 20 may compare the motion information for the two IPMVCs (i.e., one based on shifted disparity vector and one based disparity vector without shifting). In some examples, video encoder 20 may compare the motion information for the IPMVC derived from the shifting the disparity vector only with the motion information for the IPMVC derived without shifting the disparity vector. If the motion information of the two IPMVCs is the same, video encoder 20 may not include the IPMVC based on the shifted disparity vector in the candidate list, and if the motion information of the two IPMVCs is different, video encoder 20 may include the IPMVC based on the shifted disparity vector in the candidate list. Video encoder 20 may always include the IPMVC based on the disparity vector without shifting.

Video encoder 20 may inter-prediction encode the current block based on the candidate list (188). Video encoder 20 may also signal syntax elements (e.g., signaling syntax elements) that indicate whether the current block is inter-predicted in merge mode, skip mode, or AMVP mode and an index into the candidate list that video decoder 30 uses to determine the motion vector for the current block for inter-prediction encoding the current block (190).

Figure 10:
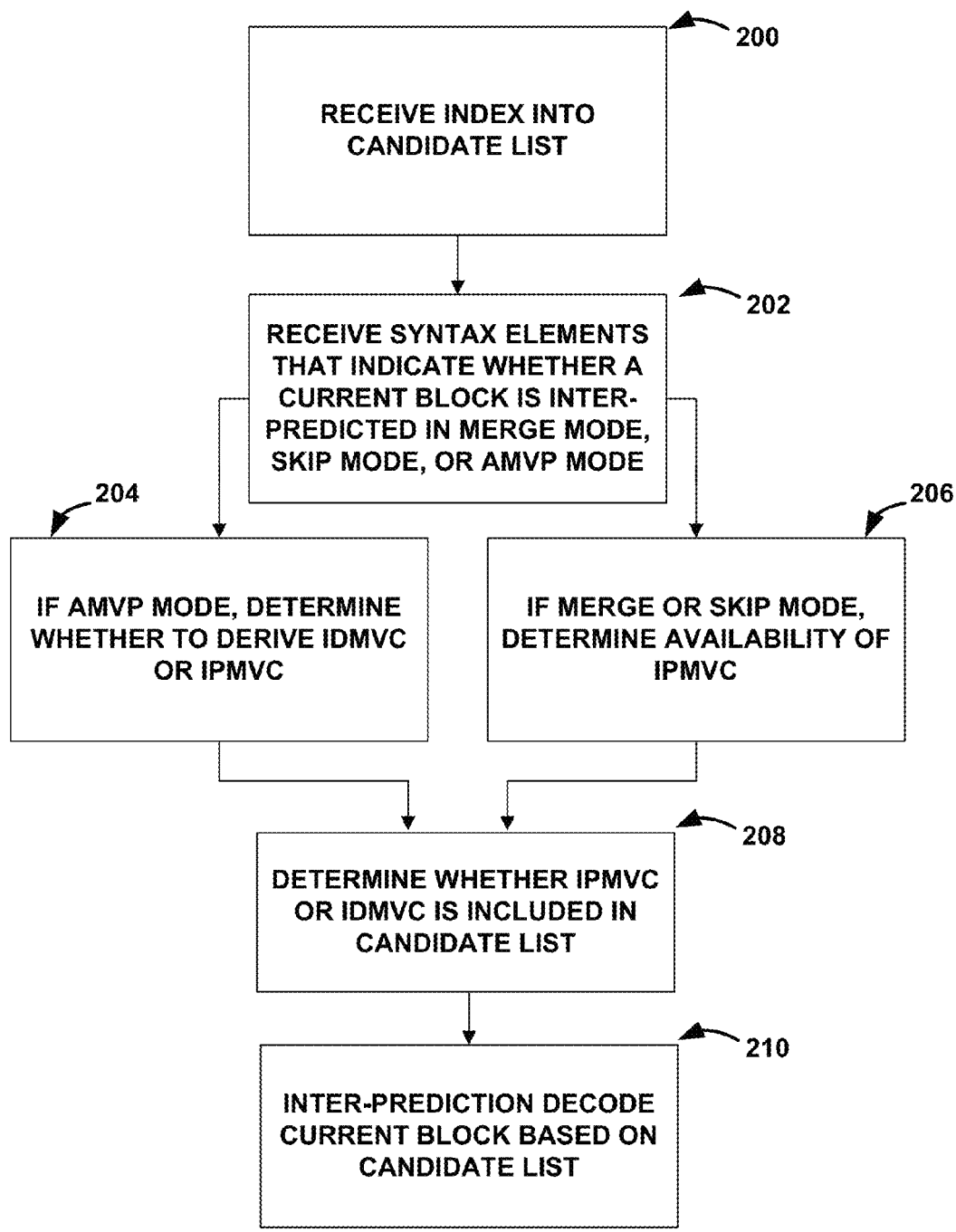
FIG. 10 is a flowchart showing an example decoding process according to the techniques of the disclosure.

FIG. 10 is a flowchart showing an example decoding process according to the techniques of the disclosure. The techniques of FIG. 10 will be described with respect to video decoder 30 but may be performed by other types of video decoder. Video decoder 30 receives and index into a candidate list (200). Video decoder 30 may receive syntax elements (e.g., decode syntax elements or decoding syntax elements) that indicate whether a current block is inter-predicted in merge mode, skip mode, or AMVP mode to determine whether the current block is inter-predicted in merge mode, skip mode, or AMVP mode (202).

If video decoder 30 determines that the current block is inter-predicted in AMVP mode, video decoder 30 may determine whether to derive an IDMVC or an IPMVC based on a reference picture index (204). For example, if the reference picture index refers to a temporal reference picture, video decoder 30 may determine an IPMVC, and if the reference picture index refers to an inter-view reference picture, video decoder 30 may determine an IDMVC.

If the current block is inter-predicted in merge mode or skip mode, video decoder 30 may determine availability of the IPMVC (206). Video decoder 30 may determine that the IPMVC is available if motion information for a reference block referred to by a disparity vector, of the current block, shifted by an offset value includes a motion vector that is a temporal motion vector that refers to a picture in the reference view with a POC value equal to a POC value of a picture identified in a reference picture list of the current block. Again, as described above, the IPMVC may be a motion vector for a reference block in a reference view referred to by a disparity vector, for the current block, shifted by a first offset value, and the IDMVC may be a disparity vector, for the current block, shifted by a second, different offset value.

In some examples, if IPMVC is available, video decoder 30 may derive the IPMVC, and avoid the deriving of the IDMVC in merge or skip mode. If IPMVC is not available and the current block is inter-predicted in merge mode or skip mode, video decoder 30 may derive the IDMVC.

Video decoder 30 may determine whether the IPMVC or the IDMVC is to be included in a candidate list (208). In some examples, video decoder 30 may include only one of the IPMVC and the IDMVC, and not both (i.e., only one of the IPMVC and the IDMVC is included in the candidate list). For instance, in merge mode, if video decoder 30 derives the IPMVC because the IPMVC is available, video decoder 30 may avoid the deriving of the IDMVC. In AMVP mode, video decoder 30 may include one of the IPMVC or the IDMVC in a candidate list based on whether the reference picture index refer to a temporal reference picture or an inter-view reference picture. Video decoder 30 may inter-prediction decode the current block based on the candidate list (210).

Also, in some examples, video decoder 30 may derive another IPMVC based on the disparity vector without shifting the disparity vector. In these examples, video decoder 30 may compare the motion information for the two IPMVCs (i.e., one based on shifted disparity vector and one based disparity vector without shifting). In some examples, video decoder 30 may compare the motion information for the IPMVC derived from the shifting the disparity vector only with the motion information for the IPMVC derived without shifting the disparity vector. If the motion information of the two IPMVCs is the same, video decoder 30 may not include the IPMVC based on the shifted disparity vector in the candidate list, and if the motion information of the two IPMVCs is different, video decoder 30 may include the IPMVC based on the shifted disparity vector in the candidate list. Video decoder 30 may always include the IPMVC based on the disparity vector without shifting.

Moreover, although the above example techniques are described with respect to multiview video coding, the techniques described in this disclosure are not so limited. For instance, the techniques described in this disclosure may be extended to scalable video coding (SVC), including extensions to the HEVC standard for scalable video coding (SHEVC).

In scalable video coding (SVC), there could be multiple layers. The layer at the very bottom level may just serve as a base layer (BL) and the layer at the very top level just as an enhancement layer (EL). All the layers in the middle may serve as both EL and BL. For example, a layer in the middle can be an EL for the layers below it, and at the same time as a BL for the layers above it. For simplicity of description, the disclosure assumes that there are two layers, a BL and an EL, in illustrating the current techniques. It should be noted that the techniques described in this disclosure are applicable to cases with multiple layers too.

The concept of a disparity vector in SCV may refer to a vector that refers to a reference block in a reference layer, where the reference layer is another layer than the layer that includes the block being inter-predicted. One example of such an inter-layer vector may be a zero vector (e.g., a vector with components (0, 0)). For SCV, the inter-layer vector may be utilized in a manner similar to that described above for the disparity vector with respect to 3D video.

As described above, for 3D video, video coder 20/30 may derive an IPMVC and an IDMVC without shifting the disparity vector and derive additional IPMVCs and IDMVCs by shifting the disparity vector, and in some examples, by different amounts (i.e., different offset values) for the additional IPMVCs relative to the additional IDMVCs, referred to as inter-view candidates generally. For SVC, video coder 20/30 may similarly derive inter-layer candidates. As one example, video coder 20/30 may derive an inter-layer candidate based on motion information inherited from a reference block in the reference layer to which the inter-layer vector refers and/or based on motion information inherited from a reference block in the reference layer to which the inter-layer vector, shifted by an offset value, refers. As another example, video coder 20/30 may derive an inter-layer candidate by converting the inter-layer vector into the inter-layer candidate and/or by converting the inter-layer vector, shifted by an offset value, into the inter-layer candidate.

Accordingly, in some examples, the techniques described in this disclosure for deriving the IPMVC and the IDMVC, and techniques for when the IPMVC and the IDMVC are derived (e.g., in merge mode, skip mode, or AMVP mode) may be extended to SVC. For SVC, video coder 20/30 may derive a first inter-layer candidate in a manner similar to deriving the IPMVC (e.g., based on motion information for a reference block in a reference layer to which an inter-layer vector or shifted inter-layer vector for the current block refers) and may derive a second inter-layer candidate in a manner similar to deriving the IDMVC (e.g., converting the inter-layer vector or shifted inter-layer vector for the current block into the inter-layer candidate). For SVC, video coder 20/30 may implement techniques similar to those described above for 3D video for the first inter-layer candidate and the second inter-layer candidate.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
    determining that a current block is inter-predicted in merge mode or inter-predicted in skip mode;
    based on the current block being inter-predicted in merge mode or inter-predicted in skip mode:
        identifying a reference block in a reference view referred to by a disparity vector, for the current block, shifted by a first offset value;
        determining that motion information for the identified reference block is not available;
        based on the motion information of the identified reference block being not available, determining that an inter-view predicted motion vector candidate (IPMVC) is not available for the current block and
        based on the IPMVC not being available, deriving an inter-view disparity motion vector candidate (IDMVC) and including the IDMVC in a candidate list for the current block, wherein the IDMVC comprises the disparity vector, for the current block, shifted by a second offset value that is different than the first offset value used to shift the disparity vector for identifying the reference block; and
    inter-prediction coding the current block in a current picture in a current view, different form the reference view, based on the candidate list.

2. The method of claim 1, wherein the current block comprises a first block, the disparity vector comprises a first disparity vector, the candidate list comprises a first candidate list, the reference block comprises a first reference block, and the reference view comprises a first reference view, the method further comprising:
    identifying a second reference block in a second reference view referred to by a second disparity vector, for a second block that is inter-predicted in merge mode or inter-predicted in skip mode, shifted by a third offset value;
    determining that an IPMVC for the second block is available based on a motion vector for the second reference block in the second reference view referred to by the second disparity vector shifted by the third offset value being a temporal motion vector that refers to a picture in the second reference view with a picture order count (POC) value that is equal to a POC value of a picture in a reference picture list for the second block
    deriving the IPMVC for the second block based on the IPMVC being available;
    avoiding the deriving of an IDMVC for the second block based on the IPMVC not being available, wherein IDMVC for the second block comprises the second disparity vector, for the second block, shifted by a fourth offset value that is different than the third offset value used to shift the second disparity vector for identifying the second reference block;
    including the IPMVC for the second block in a second candidate list for the second block; and
    inter-prediction coding the second block based on the second candidate list for the second block.

3. The method of claim 1, wherein the current block comprises a first block, the disparity vector comprises a first disparity vector, the candidate list comprises a first candidate list, the reference block comprises a first reference block, and the reference view comprises a first reference view, the method further comprising:
    determining that a reference picture index for a second block, that is inter-predicted in advance motion vector prediction (AMVP) mode, identifies one of a temporal reference picture or an inter-view reference picture;
    based on the reference picture index identifying the temporal reference picture:
        deriving an IPMVC for the second block, wherein the IPMVC for the second block comprises motion information for a second reference block in a second reference view referred to by a second disparity vector, for the second block, shifted by a third offset value;
        including the IPMVC in a second candidate list for the second block; and
        inter-prediction coding the second block based on the second candidate list and based the reference picture index identifying the inter-view reference picture:
        deriving an IDMVC for the second block, wherein the IDMVC for the second block comprises the second disparity vector, for the second block, shifted by a fourth offset value that is different than the third offset value that would have been used had the IPVMC been derived;
        including the IDMVC in a third candidate list for the second block; and
    inter-prediction coding the second block based on the third candidate list.

4. The method of claim 1, wherein the reference block comprises a first reference block, the current block comprises a first block, the disparity vector comprises a first disparity vector, and the reference view comprises a first reference view, the method further comprising:
    determining a first IPMVC for a second block that is inter-predicted in merge mode or inter-predicted in skip mode, wherein the first IPMVC comprises motion information for a second reference block in a second reference view referred to by a second disparity vector, for the second block, shifted by a third offset value;
    determining a second IPMVC for the second block, wherein the second IPMVC comprises motion information for a third reference block in the second reference view referred to by the second disparity vector, for the second block, without shifting the second disparity vector; and comparing the first IPMVC and the second IPMVC;

including the first IPMVC in a candidate list for the second block based on the comparison indicating that the second IPMVC is different than the first IPMVC; and inter-prediction coding the second block based on the candidate list for the second block.

5. The method of claim 4, wherein comparing comprises comparing the first IPMVC only with the second IPMVC.

6. The method of claim 1, further comprising:
determining the disparity vector for the current block based on one of a disparity motion vector for a neighboring block and a derived disparity vector for a neighboring block;
adding the first offset value to or subtracting the first offset value from the disparity vector to determine the disparity vector shifted by the first offset value; and
based on the IPMVC not being available, adding the second offset value to or subtracting the second offset value from the disparity vector to determine the disparity vector shifted by the second offset value.

7. The method of claim 1, wherein the second offset value comprises a fixed offset value for shifting the disparity vector horizontally.

8. The method of claim 1, wherein the motion information of the reference block comprises at least one of a motion vector and one or more reference indices for reference picture lists.

9. The method of claim 1, further comprising:
receiving an index into the candidate list,
wherein determining that the current block is inter-predicted in merge mode, or inter-predicted in skip mode comprises decoding syntax elements that indicate that the current block is inter-predicted in merge mode or inter-predicted in skip mode, and
wherein inter-prediction coding comprises inter-prediction decoding the current block based on information identified by the received index into the candidate list.

10. The method of claim 1, wherein inter-prediction coding comprises inter-prediction encoding the current block based on information in the candidate list, the method further comprising:
signaling syntax elements that indicate that the current block is inter-predicted in merge mode or inter-predicted in skip mode; and
signaling an index into the candidate list that is used to identify the information in the candidate list.

11. A device for coding video data, the device comprising a video coder configured to:
determine that a current block is inter-predicted in merge mode or inter-predicted in skip mode;
based on the current block being inter-predicted in merge mode or inter-predicted in skip mode:
identify a reference block in a reference view referred to by a disparity vector, for the current block, shifted by a first offset value;
determine that motion information for the identified reference block is not available;
based on the motion information of the identified reference block being not available, determine that an inter-view predicted motion vector (IPMVC) is not available for the current block and
based on the IPMVC not being available, derive an inter-view disparity motion vector candidate (IDMVC) and include the IDMVC in a candidate list for the current block, wherein the IDMVC comprises the disparity vector, for the current block, shifted by a second offset value that is different than the first offset value used to shift the disparity vector for identifying the reference block; and
inter-prediction code the current block in a current picture in a current view, different form the reference view, based on the candidate list.

12. The device of claim 11, wherein the current block comprises a first block, the disparity vector comprises a first disparity vector, the candidate list comprises a first candidate list, the reference block comprises a first reference block, and the reference view comprises a first reference view, wherein the video coder is configured to:
identify a second reference block in a second reference view referred to by a second disparity vector, for a second block that is inter-predicted in merge mode or inter-predicted in skip mode, shifted by a third offset value;
determine that an IPMVC for the second block is available based on a motion vector for the second reference block in the second reference view referred to by the second disparity vector shifted by the third offset value being a temporal motion vector that refers to a picture in the second reference view with a picture order count (POC) value that is equal to a POC value of a picture in a reference picture list for the current block;
derive the IPMVC for the second block based on the IPMVC being available;
avoid the deriving of an IDMVC for the second block based on the IPMVC not being available, wherein IDMVC for the second block comprises the second disparity vector, for the second block, shifted by a fourth offset value that is different than the third offset value used to shift the second disparity vector for identifying the second reference block;
include the IPMVC for the second block in a second candidate list for the second block; and
inter-prediction code the second block based on the second candidate list for the second block.

13. The device of claim 11, wherein the current block comprises a first block, the disparity vector comprises a first disparity vector, the candidate list comprises a first candidate list, the reference block comprises a first reference block, and the reference view comprises a first reference view, wherein the video coder is configured to:
determine that a reference picture index for a second block, that is inter-predicted in advance motion vector prediction (AMVP) mode, identifies one of a temporal reference picture or an inter-view reference picture;
based on the reference picture index identifying the temporal reference picture:
derive an IPMVC for the second block, wherein the IPMVC for the second block comprises motion information for a second reference block in a second reference view referred to by a second disparity vector, for the second block, shifted by a third offset value;
include the IPMVC in a second candidate list for the second block; and
inter-prediction code the second block based on the second candidate list; and
based the reference picture index identifying the inter-view reference picture:
derive an IDMVC for the second block, wherein the IDMVC for the second block comprises the second disparity vector, for the second block, shifted by a fourth offset value that is different than the third offset value that would have been used had the IPMVC been derived;
include the IDMVC in a third candidate list for the second block; and
inter-prediction code the second block based on the third candidate list.

14. The device of claim 11, wherein the reference block comprises a first reference block, the current block comprises a first block, the disparity vector comprises a first disparity vector, and the reference view comprises a first reference view, and wherein the video coder is configured to:
determine a first IPMVC for a second block that is inter-predicted in merge mode or inter-predicted in skip mode, wherein the first IPMVC comprises motion information for a second reference block in a second reference view referred to by a second disparity vector, for the second block, shifted by a third offset value;
determine a second IPMVC for the second block, wherein the second IPMVC comprises motion information for a third reference block in the second reference view referred to by the second disparity vector, for the second block, without shifting the second disparity vector;
compare the first IPMVC and the second IPMVC;
include the first IPMVC in a candidate list for the second block based on the comparison indicating that the second IPMVC is different than the first IPMVC; and
inter-prediction code the second block based on the candidate list for the second block.

15. The device of claim 14, wherein, to compare, the video coder is configured to compare the first IPMVC only with the second IPMVC.

16. The device of claim 11, wherein the video coder is configured to:
determine the disparity vector for the current block based on one of a disparity motion vector for a neighboring block and a derived disparity vector for a neighboring block;
add the first offset value to or subtract the first offset value from the disparity vector to determine the disparity vector shifted by the first offset value; and
based on the IPMVC not being available, add the second offset value to or subtract the second offset value from the disparity vector to determine the disparity vector shifted by the second offset value.

17. The device of claim 11, wherein the second offset value comprises a fixed offset value for shifting the disparity vector horizontally.

18. The device of claim 11, wherein the motion information of the reference block comprises at least one of a motion vector and one or more reference indices for reference picture lists.

19. The device of claim 11, wherein the video coder comprises a video decoder, wherein the video decoder is configured to receive an index into the candidate list, wherein, to determine that the current block is inter-predicted in merge mode or inter-predicted in skip mode, the video decoder is configured to decode syntax elements that indicate that the current block is inter-predicted in merge mode or inter-predicted in skip mode, and wherein, to inter-prediction code, the video decoder is configured to inter-prediction decode the current block based on information identified by the received index into the candidate list.

20. The device of claim 11, wherein the video coder comprises a video encoder, wherein, to inter-prediction code, the video encoder is configured to inter-prediction encode the current block based on information in the candidate list, and wherein the video encoder is configured to signal syntax elements that indicate that the current block is inter-predicted in merge mode or inter-predicted in skip mode, and signal an index into the candidate list that is used to identify the information in the candidate list.

21. The device of claim 11, wherein the device comprises one of:
an integrated circuit (IC);
a microprocessor; and
a wireless communication device.

22. A non-transitory computer-readable storage medium having instructions stored thereon that when executed cause one or more processors of a device for coding video data to:
determine that a current block is inter-predicted in merge mode or inter-predicted in skip mode;
based on the current block being inter-predicted in merge mode or inter-predicted in skip mode:
identify a reference block in a reference view referred to by a disparity vector, for the current block, shifted by a first offset value;
determine that motion information for the identified reference block is not available;
based on the motion information of the identified reference block being not available, determine that an inter-view predicted motion vector candidate (IPMVC) is not available for the current block and
based on the IPMVC not being available, derive an inter-view disparity motion vector candidate (IDMVC) and include the IDMVC in a candidate list for the current block, wherein the IDMVC comprises the disparity vector, for the current block, shifted by a second offset value that is different than the first offset value used to shift the disparity vector for identifying the reference block; and
inter-prediction code the current block in a current picture in a current view, different form the reference view, based on the candidate list.

23. The non-transitory computer-readable storage medium of claim 22, wherein the reference block comprises a first reference block, the current block comprises a first block, the disparity vector comprises a first disparity vector, and the reference view comprises a first reference view, the computer-readable storage medium further comprising instructions that cause the one or more processors to:
determine a first IPMVC for a second block that is inter-predicted in merge mode or inter-predicted in skip mode, wherein the first IPMVC comprises motion information for a second reference block in a second reference view referred to by a second disparity vector, for the second block, shifted by a third offset value;
determine a second IPMVC for the second block, wherein the second IPMVC comprises motion information for a third reference block in the second reference view referred to by the second disparity vector, for the second block, without shifting the second disparity vector;
compare the first IPMVC only with the second IPMVC;
include the first IPMVC in a candidate list for the second block based on the comparison indicating that the second IPMVC is different than the first IPMVC; and
inter-prediction code the second block based on the candidate list for the second block.

24. A device for coding video data comprising:
means for determining that a current block is inter-predicted in merge mode or inter-predicted in skip mode;
means for identifying a reference block in a reference view referred to by a disparity vector, for the current block, shifted by a first offset value;

means for determining that motion information for the identified reference block is not available;

means for determining that an inter-view predicted motion vector candidate (IPMVC) is not available for the current block;

means for deriving an inter-view disparity motion vector candidate (IDMVC) and including the IDMVC in a candidate list for the current block based on the IPMVC being not available, wherein the IDMVC comprises the disparity vector, for the current block, shifted by a second offset value that is different than the first offset value used to shift the disparity vector for identifying the reference block; and means for inter-prediction coding the current block in a current picture in a current view, different form the reference view, based on the candidate list.

25. The device of claim 24, wherein the reference block comprises a first reference block, the current block comprises a first block, the disparity vector comprises a first disparity vector, and the reference view comprises a first reference view, the device further comprising:

means for determining a first IPMVC for a second block that is inter-predicted in merge mode or inter-predicted in skip mode, wherein the first IPMVC comprises motion information for a second reference block in a second reference view referred to by a second disparity vector, for the second block, shifted by a third offset value;

means for determining a second IPMVC for the second block, wherein the second IPMVC comprises motion information for a third reference block in the second reference view referred to by the second disparity vector, for the second block, without shifting the second disparity vector; and means for comparing the first IPMVC only with the second IPMVC;

means for including the first IPMVC in a candidate list for the second block based on the comparison indicating that the second IPMVC is different than the first IPMVC; and means for inter-prediction coding the second block based on the candidate list for the second block.

* * * * *